(12) United States Patent
Borgerding

(10) Patent No.: US 8,800,086 B1
(45) Date of Patent: Aug. 12, 2014

(54) SHIELDS OR SEALS TO SHELTER AN AREA UNDERNEATH A DOCK LEVELER

(71) Applicant: Gary Borgerding, Dubuque, IA (US)

(72) Inventor: Gary Borgerding, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 14/017,069

(22) Filed: Sep. 3, 2013

(51) Int. Cl.
 *B65G 69/28* (2006.01)
 *B65G 69/34* (2006.01)

(52) U.S. Cl.
 USPC ........................................... 14/71.1; 52/173.2

(58) Field of Classification Search
 USPC ........................................... 14/71.1; 52/173.2
 IPC ............................................. B65G 69/28,69/34
 See application file for complete search history.

(56) References Cited

U.S. PATENT DOCUMENTS

| | | | | |
|---|---|---|---|---|
| 3,840,930 A | * | 10/1974 | Wanddell | 14/71.3 |
| 4,279,050 A | * | 7/1981 | Abbott | 14/71.3 |
| 4,293,969 A | | 10/1981 | Frommelt | |
| 4,422,199 A | * | 12/1983 | Frommelt | 14/71.1 |
| 4,662,021 A | * | 5/1987 | Hagen et al. | 14/71.3 |
| 4,682,382 A | * | 7/1987 | Bennett | 14/71.3 |
| 5,001,799 A | | 3/1991 | Alexander et al. | |
| 5,313,681 A | | 5/1994 | Alexander | |
| 5,396,676 A | | 3/1995 | Alexander et al. | |
| 5,416,941 A | * | 5/1995 | Hageman | 14/71.7 |
| 6,502,268 B2 | * | 1/2003 | Ashelin et al. | 14/71.1 |
| 7,146,673 B1 | * | 12/2006 | Digmann et al. | 14/71.5 |
| 7,334,281 B2 | * | 2/2008 | Digmann et al. | 14/71.1 |
| 7,584,517 B2 | * | 9/2009 | Digmann et al. | 14/71.1 |
| 7,594,290 B2 | * | 9/2009 | Eungard et al. | 14/69.5 |
| 7,877,831 B2 | * | 2/2011 | Digmann et al. | 14/71.1 |
| 2002/0152562 A1 | | 10/2002 | Ashelin et al. | |
| 2007/0101517 A1 | | 5/2007 | Digmann et al. | |
| 2007/0101518 A1 | | 5/2007 | Digmann et al. | |
| 2008/0052843 A1 | | 3/2008 | Eungard et al. | |
| 2009/0126130 A1 | * | 5/2009 | Bettendorf et al. | 14/71.5 |

FOREIGN PATENT DOCUMENTS

| | | |
|---|---|---|
| EP | 1445222 | 8/2004 |
| EP | 2 060 517 | * 5/2009 |
| NL | 7707810 | 1/1979 |

* cited by examiner

*Primary Examiner* — Gary Hartmann
(74) *Attorney, Agent, or Firm* — Hanley, Flight & Zimmerman, LLC

(57) ABSTRACT

An example dock leveler disclosed herein includes a deck and a lip structure translatable relative to the deck. A frame is disposed within a pit underneath the deck and includes a deck-supporting surface. A deck-supporting foot extends from the lip structure to engage the deck-supporting surface. A weather shield has a lower end and an upper end, the lower end of the weather shield coupled to at least one of the frame and a wall of the pit, the upper end of the weather shield is carried by the lip structure, the lower end of the weather shield is positioned forward of the deck-supporting foot when the deck is in a cross-traffic position while the lip structure is in a retracted position, and the deck-supporting foot is positioned forward of the lower end of the weather shield when the lip structure is in an extended position.

32 Claims, 15 Drawing Sheets

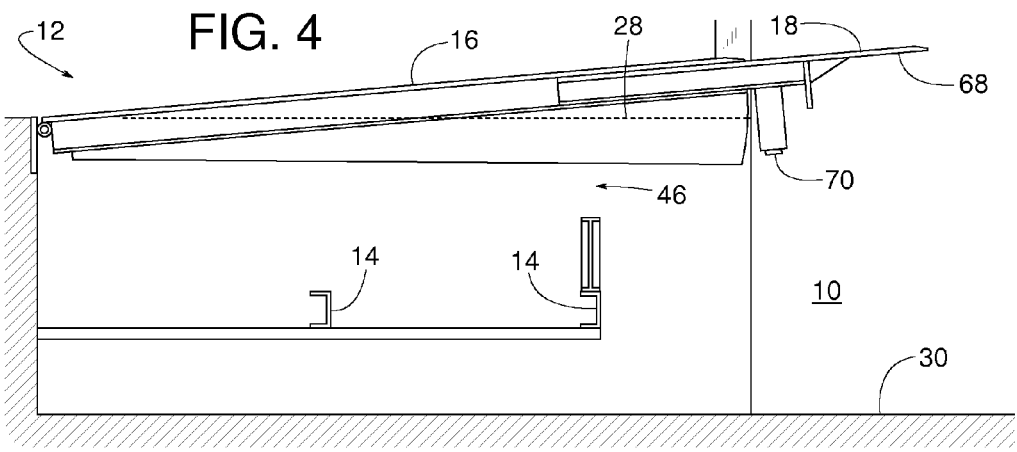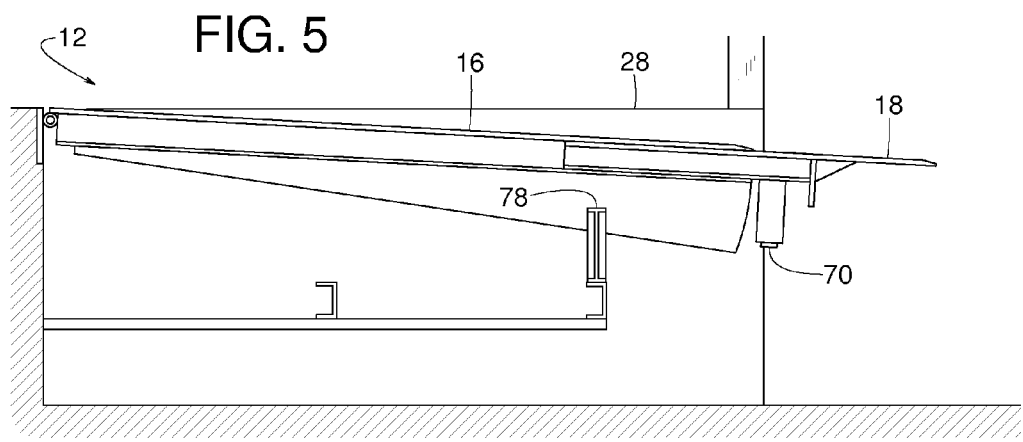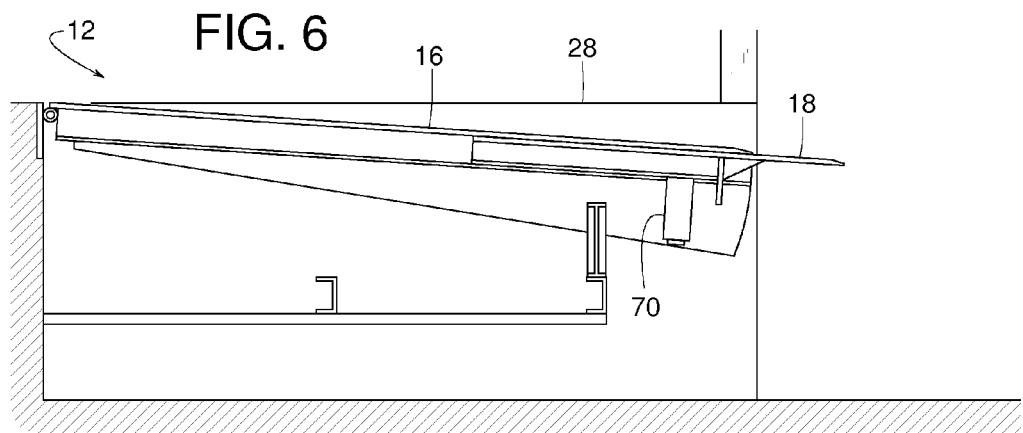

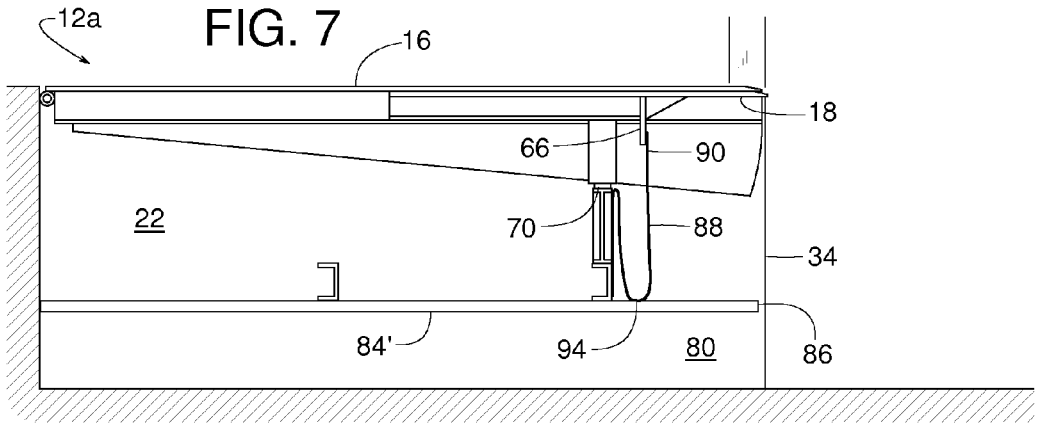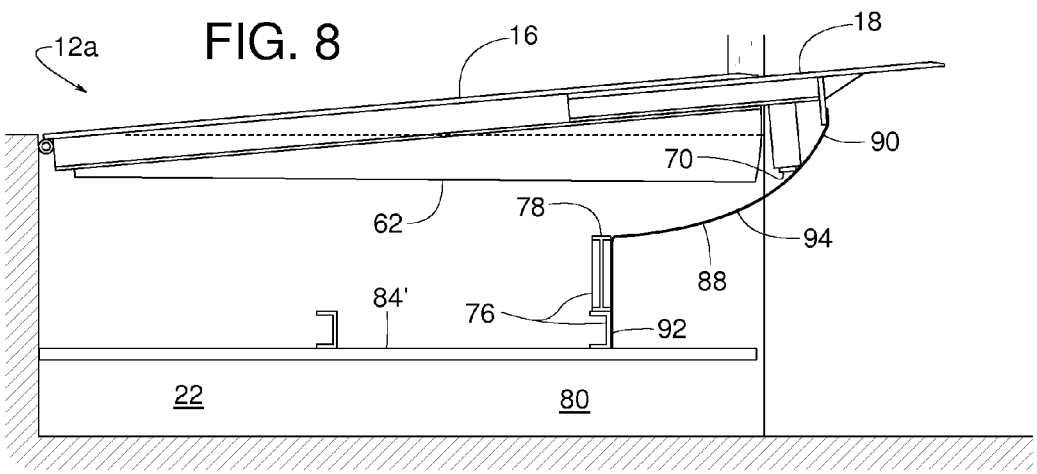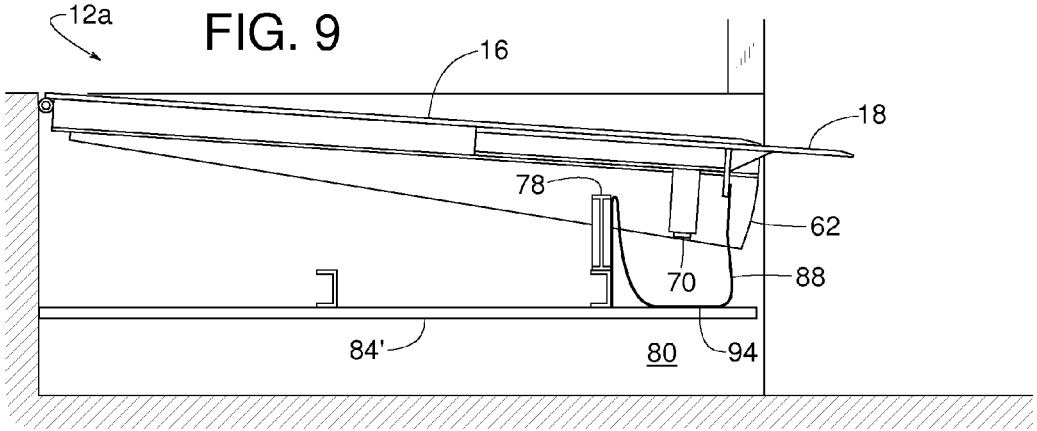

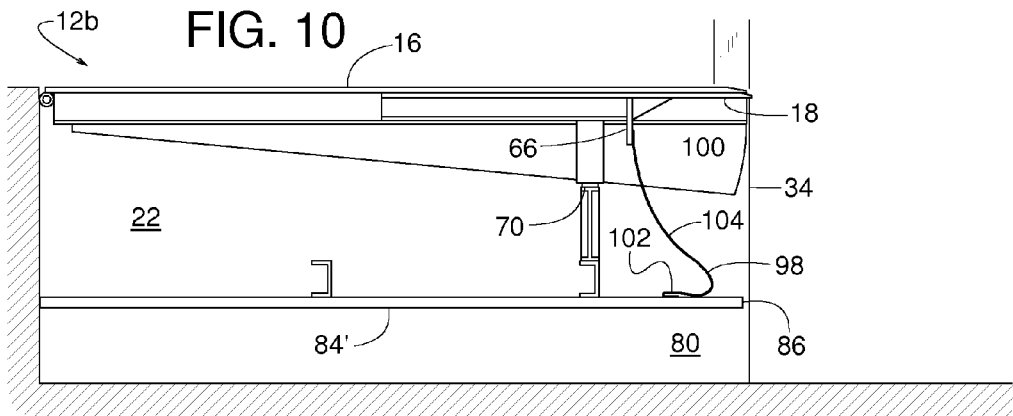
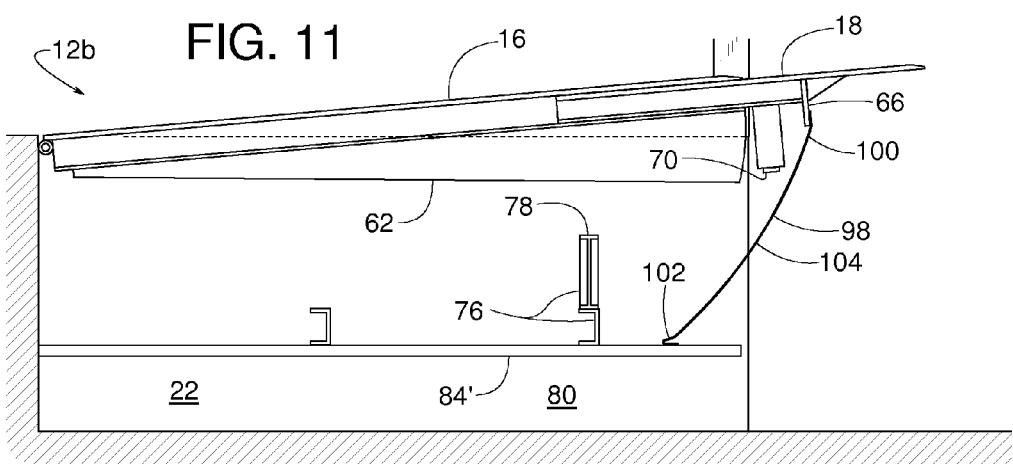
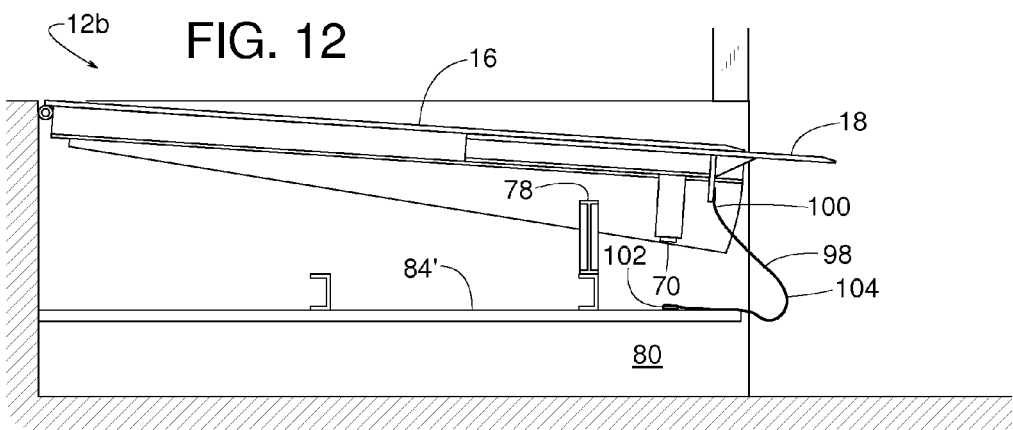

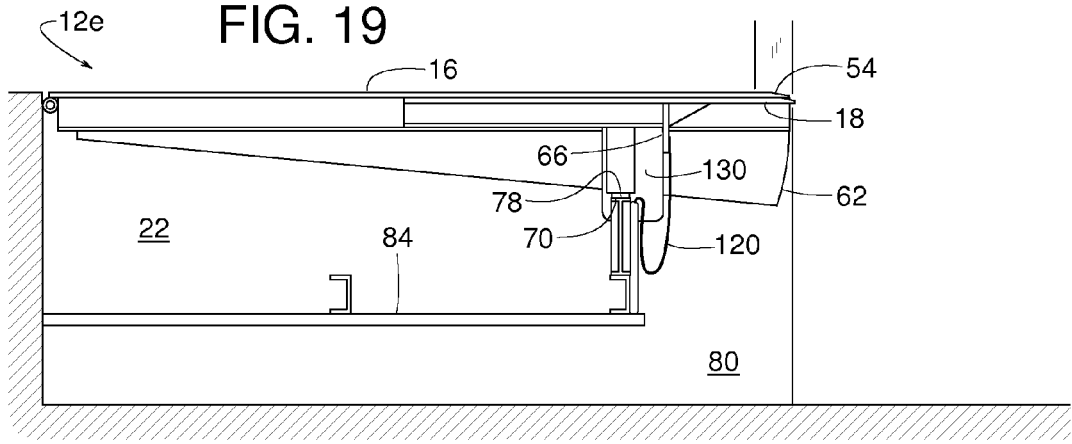
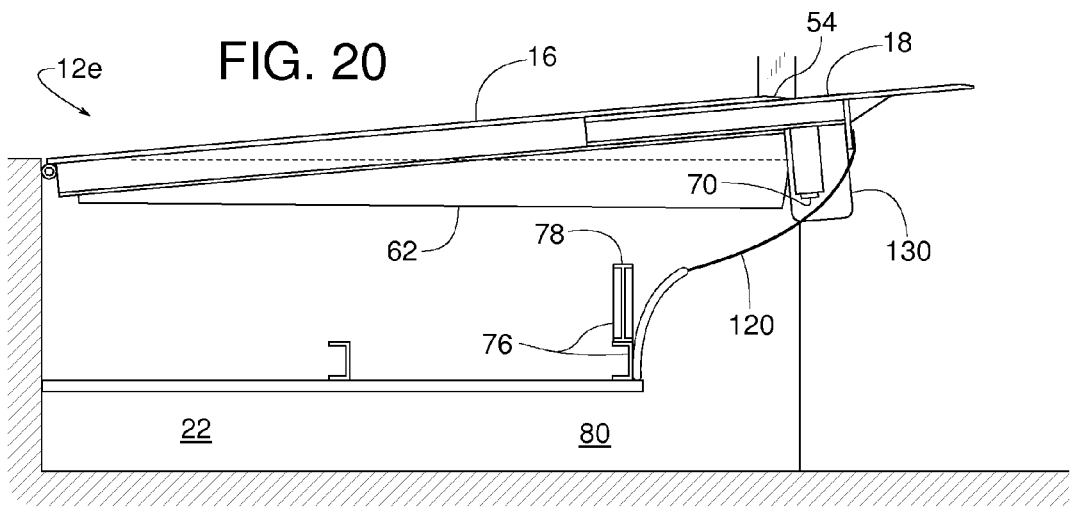
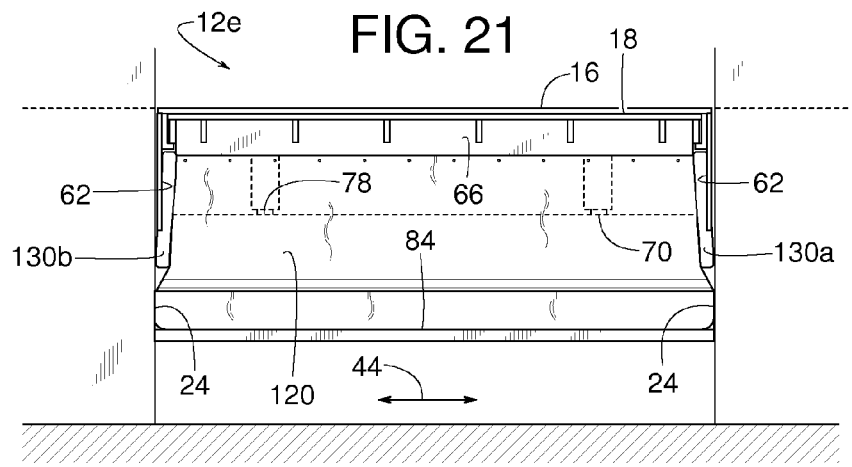

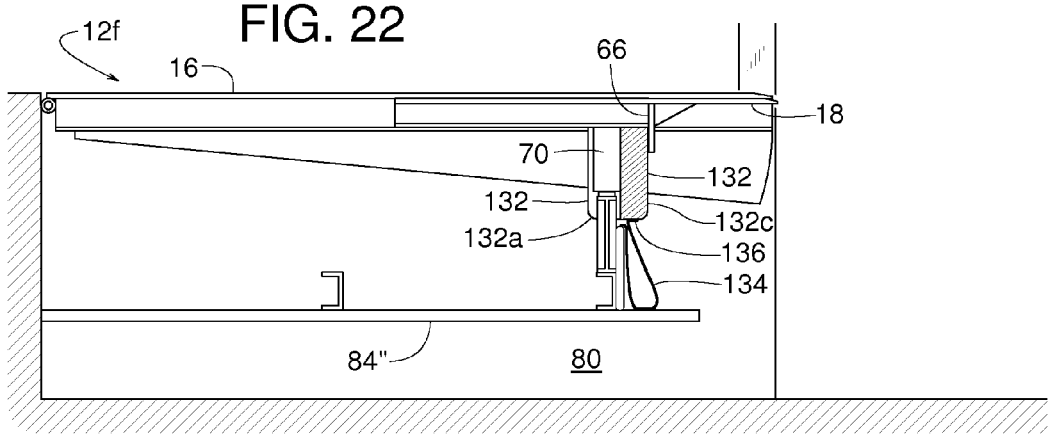
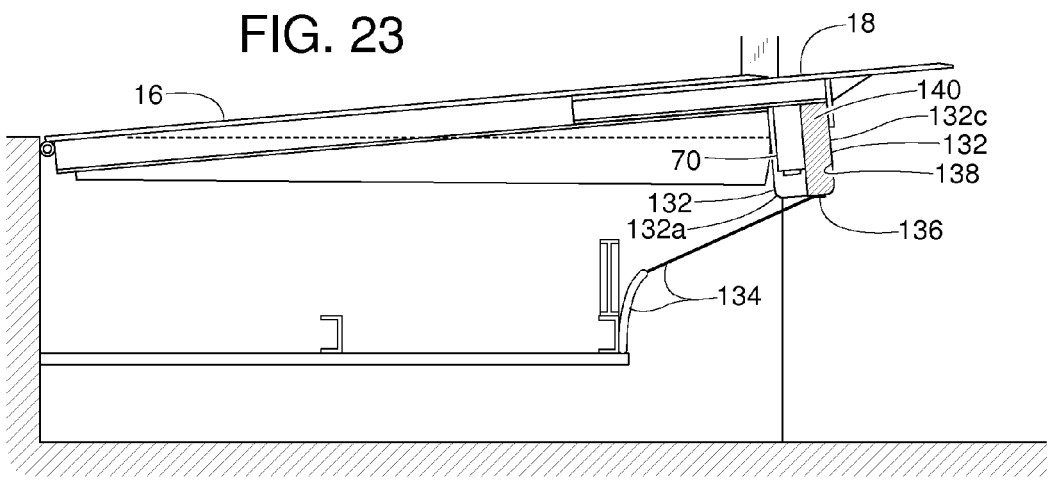
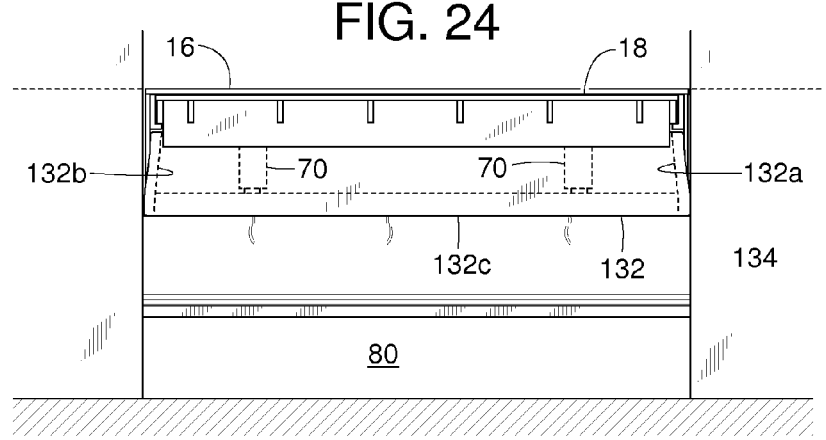

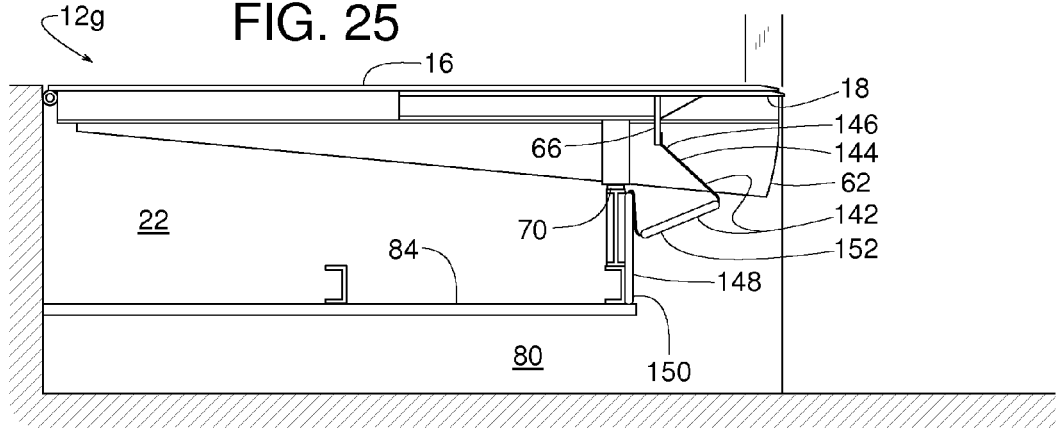
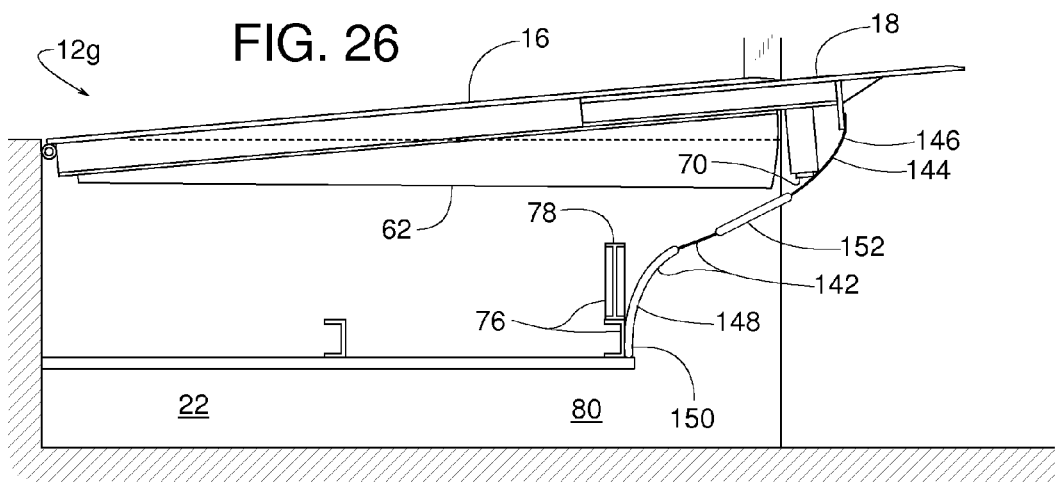
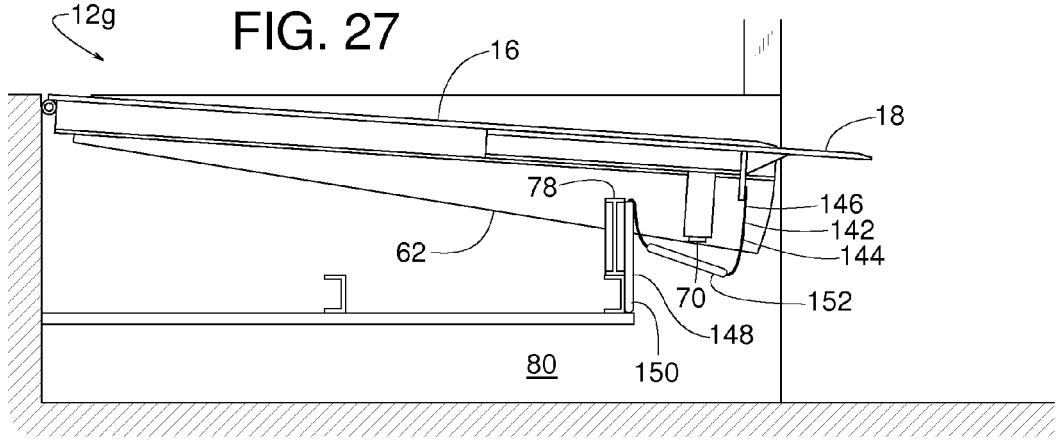

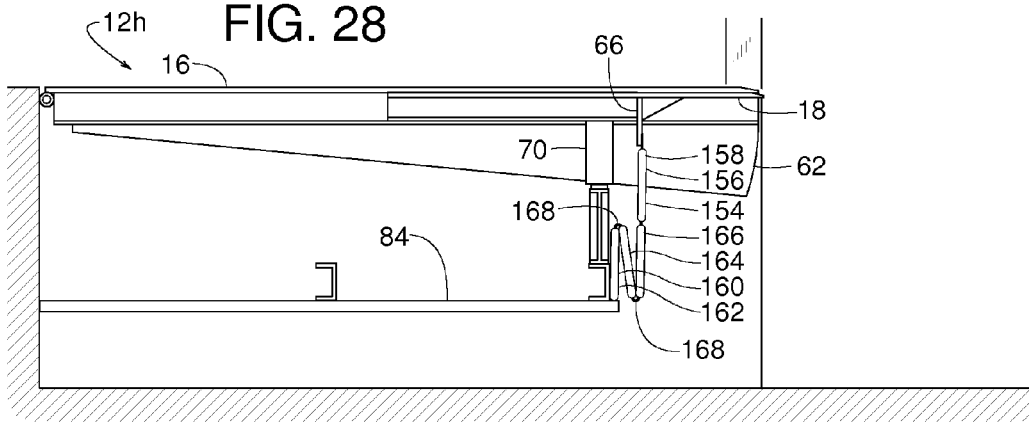
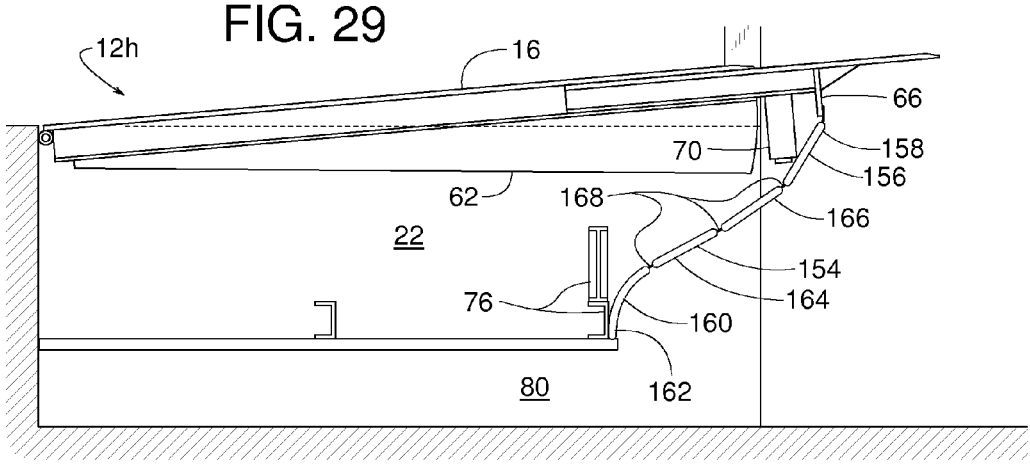
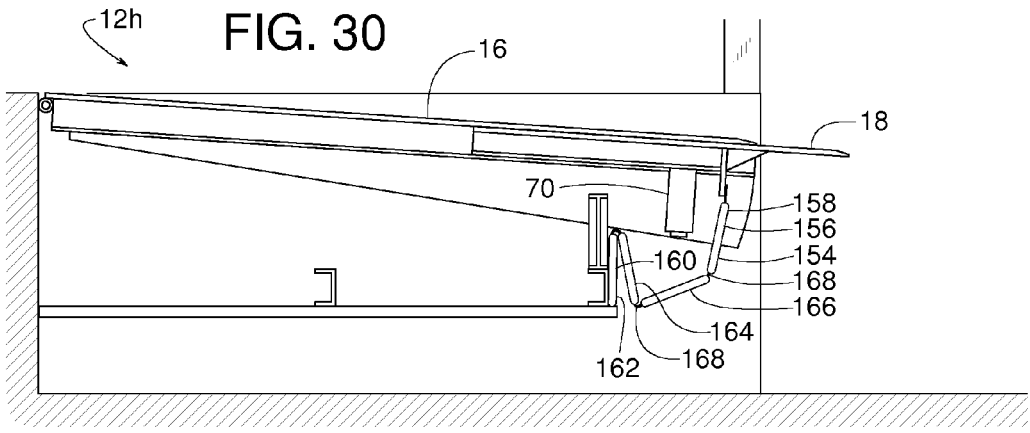

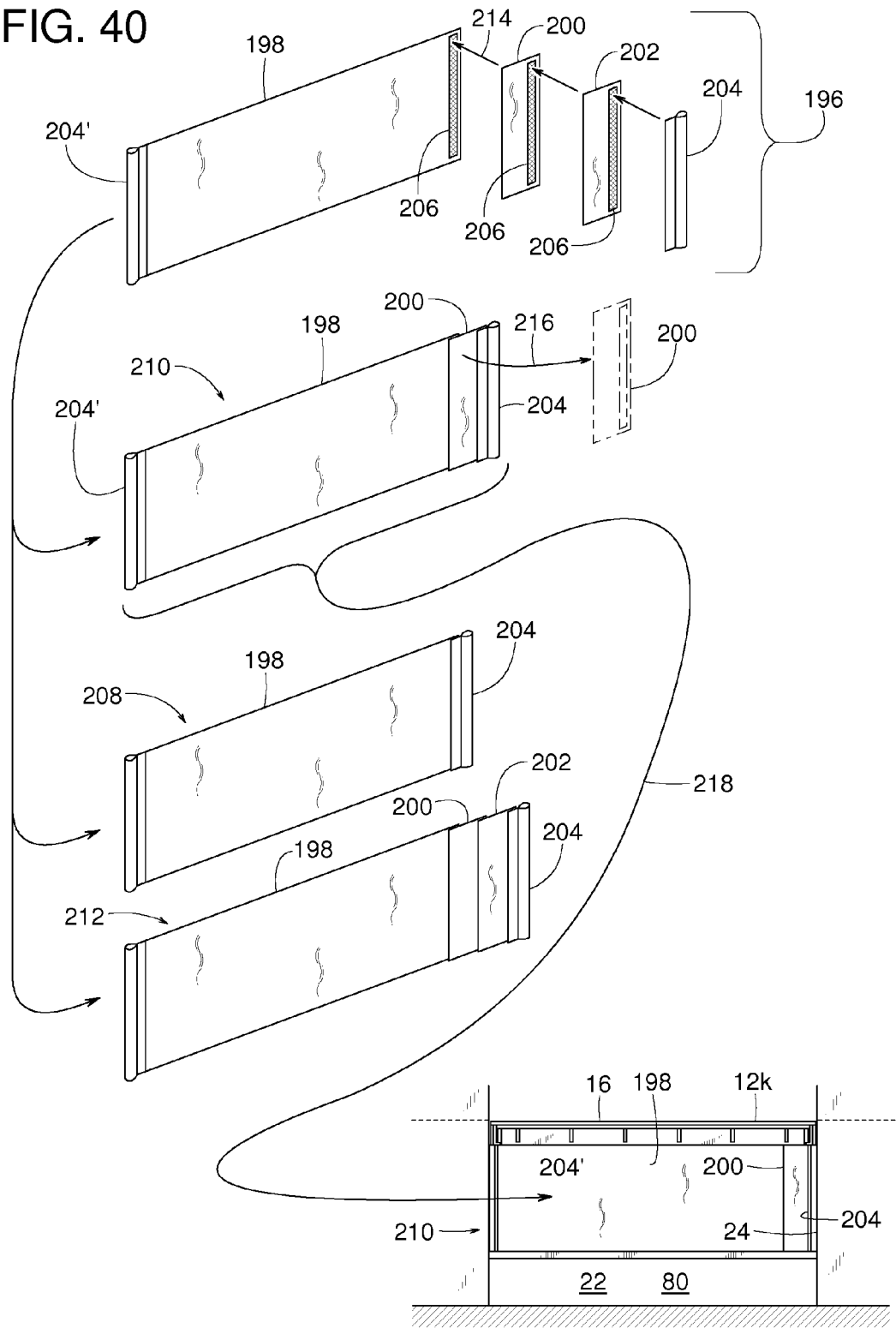

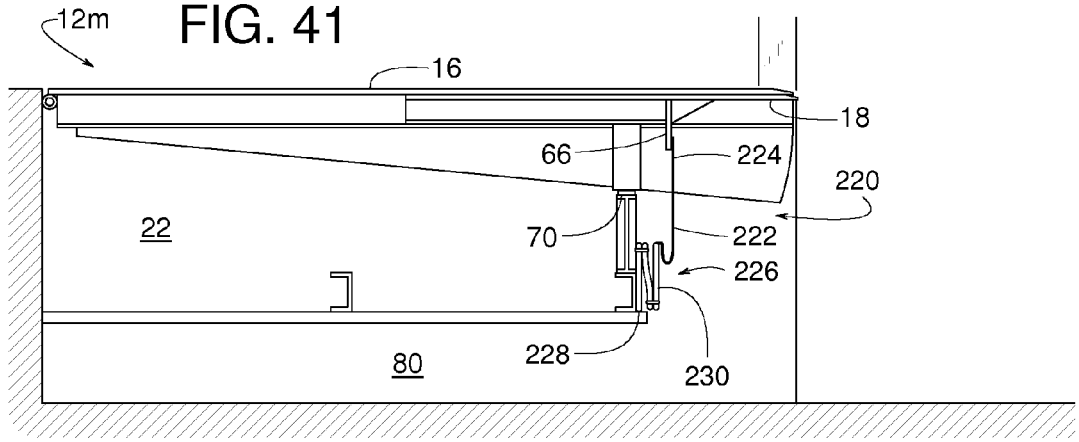
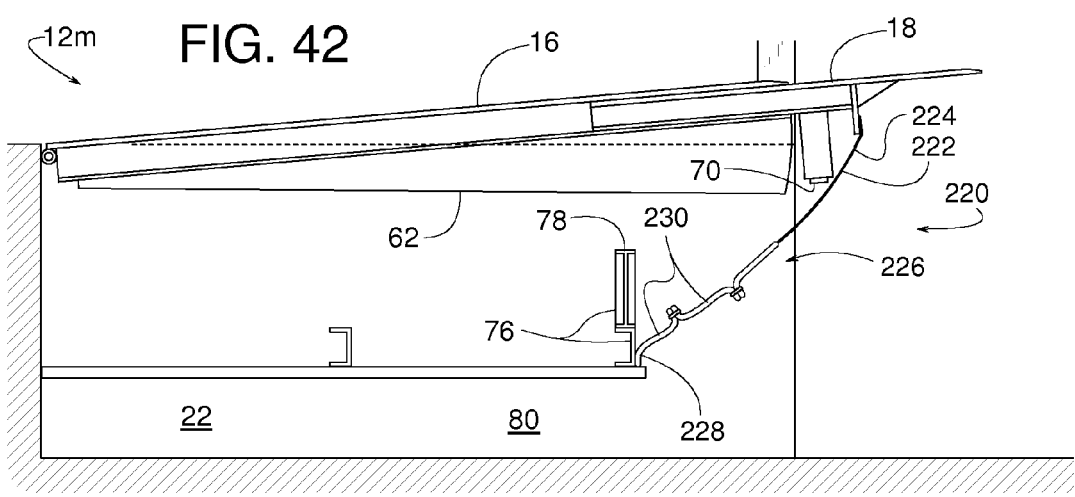
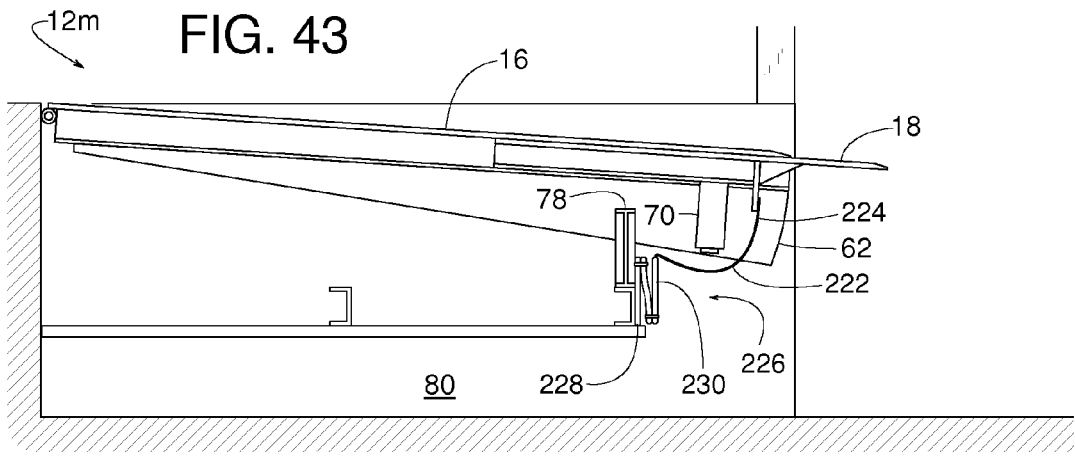

SHIELDS OR SEALS TO SHELTER AN AREA UNDERNEATH A DOCK LEVELER

FIELD OF THE DISCLOSURE

This patent generally pertains to dock levelers at vehicle loading docks and, more specifically, to shield or seals to shelter an area underneath a dock leveler.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along its back edge to vary the height of its front edge. A retractable extension plate or lip pivots or translates outward from the deck's front edge to span a gap between a rear of the truck bed and the front edge of the deck. The deck and lip provide a bridge between the dock's platform and the vehicle's bed so that personnel and material handling equipment can readily move on and off the vehicle during loading and unloading operations.

To help shield against weather while a vehicle is being serviced at the dock, a seal is usually installed around the perimeter of the doorway. Such seals are typically installed along upper and side edges of the doorway to help seal any air gaps that may otherwise exist between a face of the building and the rear of the vehicle. The dock leveler lip, when resting upon the rear of the vehicle, may provide a seal to a portion of a lower end of the doorway.

The area or pit underneath a dock leveler's deck, however, is usually exposed to outside air. This can create problems, particularly when there is a significant temperature differential between the indoor and outdoor air. Warm outside air, for example, may condense underneath a relatively cool deck of a dock leveler used in a cold storage warehouse. The condensation can promote corrosion of various parts of the dock leveler. Conversely, a heated building during the winter may lose a significant amount of heat by thermal conduction through the deck, as cold outside air cools the deck from underneath. Moreover, when the indoor air is relatively warm while the deck is cooled by outside air, condensation can form on top of the deck.

BRIEF DESCRIPTION OF THE DRAWINGS

FIG. 4 is a side cross-sectional view similar to FIG. 1 but showing the example deck in a raised position and the lip in the extended position.

FIG. 5 is a side cross-sectional view similar to FIG. 1 but showing the example deck in a lowered position.

FIG. 6 is a side cross-sectional view similar to FIG. 5 but showing the example lip in a partially extended position.

FIG. 7 is a side cross-sectional view similar to FIG. 1 but showing another example dock leveler constructed in accordance with the teachings disclosed herein, wherein the deck is shown in the cross-traffic position and the lip is in the retracted position.

FIG. 8 is a side cross-sectional view similar to FIG. 7 but showing the example deck in a raised position and the example lip in an extended position.

FIG. 9 is a side cross-sectional view similar to FIG. 8 but showing the example deck in a lowered position and the example lip in a partially extended position.

FIG. 10 is a side cross-sectional view similar to FIG. 1 but showing another example dock leveler constructed in accordance with the teachings disclosed herein, wherein the deck is shown in the cross-traffic position and the lip is in the retracted position.

FIG. 11 is a side cross-sectional view similar to FIG. 10 but showing the example deck in a raised position and the example lip in an extended position.

FIG. 12 is a side cross-sectional view similar to FIG. 11 but showing the example deck in a lowered position and the example lip in a partially extended position.

FIG. 19 is a side cross-sectional view similar to FIG. 1 but showing another example dock leveler constructed in accordance with the teachings disclosed herein, wherein the deck is shown in the cross-traffic position and the lip is in the retracted position.

FIG. 20 is a side cross-sectional view similar to FIG. 19 but showing the example deck in a raised position and the example lip in an extended position.

FIG. 21 is a right end view of FIG. 19.

FIG. 22 is a side cross-sectional view similar to FIG. 1 but showing another example dock leveler constructed in accordance with the teachings disclosed herein, wherein the deck is shown in the cross-traffic position and the lip is in the retracted position.

FIG. 23 is a side cross-sectional view similar to FIG. 22 but showing the example deck in a raised position and the example lip in an extended position.

FIG. 24 is a right end view of FIG. 22.

FIG. 25 is a side cross-sectional view similar to FIG. 1 but showing another example dock leveler constructed in accordance with the teachings disclosed herein. A deck of the example dock leveler is shown in a cross-traffic position and a lip of the example dock leveler is shown in the retracted position.

FIG. 26 is a side cross-sectional view similar to FIG. 25 but showing the example deck in a raised position and showing the example lip in an extended position.

FIG. 27 is a side cross-sectional view similar to FIG. 26 but showing the example deck in a lowered position and the example lip in a partially extended position.

FIG. 28 is a side cross-sectional view similar to FIG. 1 but showing another example dock leveler constructed in accordance with the teachings disclosed herein, wherein the deck is shown in the cross-traffic position and the lip is in the retracted position.

FIG. 29 is a side cross-sectional view similar to FIG. 28 but showing the example deck in a raised position and the example lip in an extended position.

FIG. 30 is a side cross-sectional view similar to FIG. 29 but showing the example deck in a lowered position and the example lip in a partially extended position.

FIG. 40 is an exploded perspective view plus a right end view of example dock leveler in accordance with the teachings disclosed herein.

FIG. 41 is a side cross-sectional view similar to FIG. 1 but showing another example dock leveler constructed in accordance with the teachings disclosed herein, wherein the deck is shown in the cross-traffic position and the lip is in the retracted position.

FIG. 42 is a side cross-sectional view similar to FIG. 41 but showing the example deck in a raised position and the example lip in an extended position.

FIG. 43 is a side cross-sectional view similar to FIG. 42 but showing the example deck in a lowered position and the example lip in a partially extended position.

DETAILED DESCRIPTION

Example weather shields disclosed herein are configured for use with dock levelers having deck-support legs that support a deck at a cross-traffic position (e.g., a substantially horizontal or level position). In particular, the deck-supporting legs of some such example dock levelers disclosed herein protrude downward from an underside of the deck and move along with a lip of the deck and may cause areas underneath the deck that may be difficult to seal. Some example weather shields disclosed herein shift or move with the deck and/or lip in a manner that maintains an effective seal regardless of the positions of the deck, lip and/or deck-supporting legs. For loading docks with an open area underneath a dock leveler that accommodates a rear liftgate of a truck, some example weather shields disclosed herein include means to prevent the example shield from obstructing the open area underneath the dock leveler. Some example weather shields disclosed herein include removable segments to enable adjustability of a dimensional width of the example weather shields disclosed herein.

Figure 1:
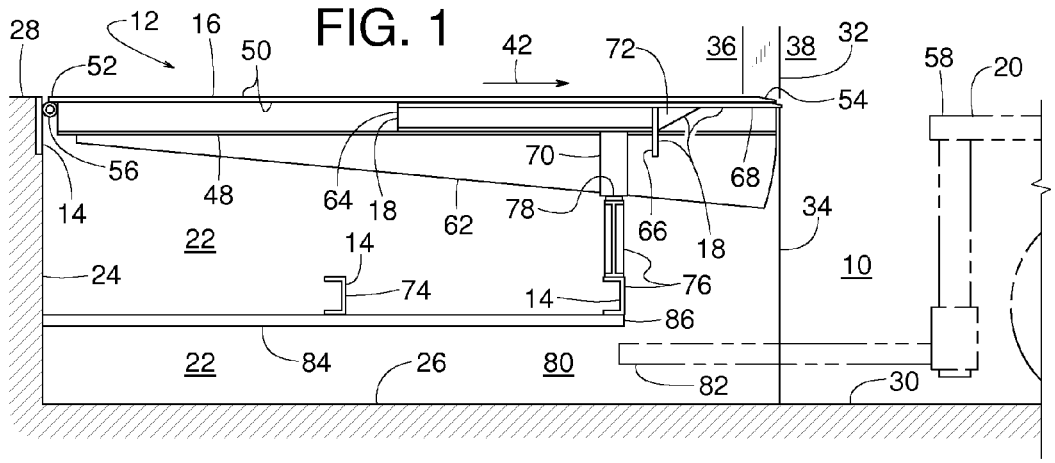
FIG. 1 is a side cross-sectional view of an example dock leveler constructed in accordance with the teachings disclosed herein, wherein the dock leveler's deck is shown in a cross-traffic position and an adjacent vehicle is shown in phantom lines.
Figure 2:
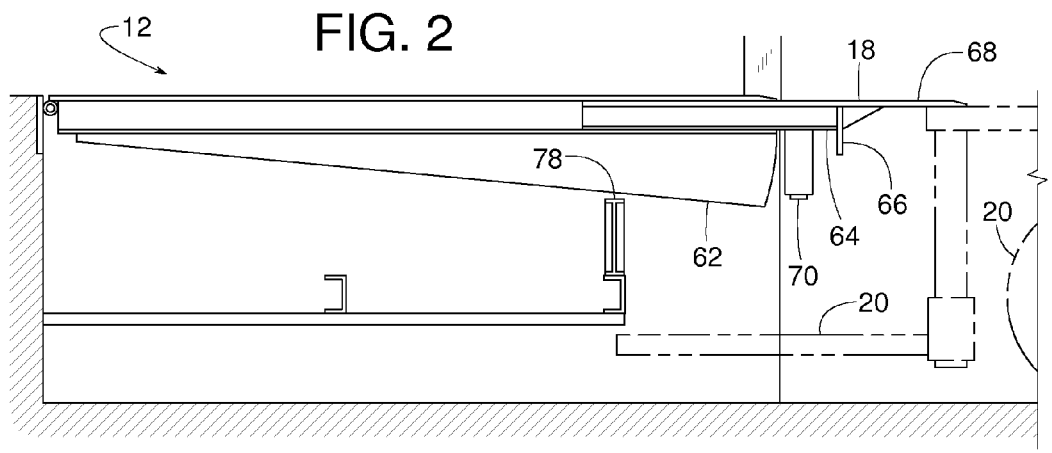
FIG. 2 is a side cross-sectional view similar to FIG. 1 but showing a lip of the example dock leveler at an extended position.
Figure 3:
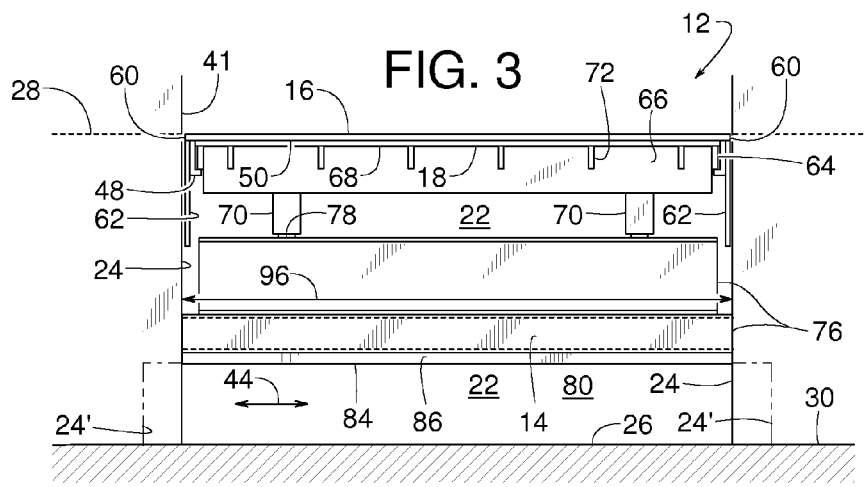
FIG. 3 is a right end view of FIG. 1.

FIGS. 1-6 show an example loading dock 10 with an example dock leveler 12 comprising a frame 14 supporting a vertically adjustable deck 16, which in turn carries a lip structure 18 that can extend and retract relative to deck 16. The term, "vertically adjustable deck" means that the elevation of at least a portion of the deck can be changed. Deck 16 and lip structure 18 are shown in various positions for loading and unloading cargo of a vehicle 20 (e.g., a truck or trailer). Dock leveler 12 is installed within a pit 22 defined by a wall 24 that extends from a ground surface 26 to a platform 28 of dock 10. Some examples of wall 24 are substantially vertical and/or flat to provide a substantially uniform pit width. Some examples of wall 24 are inclined, stepped and/or irregular to provide a non-uniform pit width. In the illustrated examples, ground surface 26 lies generally flush with a driveway 30 upon which vehicle 20 is parked. A building wall 32, defining a dock face 34, separates a building's interior 36 from an outdoor area 38. In some examples, a door selectively opens and closes across a doorway 41 through wall 32. For reference, arrow 42 of FIG. 1 represents a forward direction relative to building wall 32, and arrow 44 of FIG. 3 represents a horizontal or lateral direction relative to building wall 32, where forward direction 42 is perpendicular to lateral direction 44. Dock face 34 generally faces in forward direction 42.

To illustrate an undesirable air gap 46 (FIG. 4) that can exist between deck 16 and frame 14, FIGS. 1-6 show dock leveler 12 without a weather shield that, if installed in the area of gap 46, could block outside extreme temperature air and/or other elements from entering or flowing through gap 46 and circulating underneath deck 16. FIGS. 7-36 show various example weather shields or seals constructed in accordance with the teachings disclosed herein to seal gap 46, and FIG. 37 illustrates example methods for producing and using the example weather shields or seals disclosed herein. In the present detailed description, dock leveler 12 without a weather shield is described first, example dock levelers with example weather shields are described next, and a description of example dock leveler methods is after that.

Referring first to the example shown in FIGS. 1-6, deck 16 includes a plurality of joists 48 supporting a deck plate 50 that extends from a rear edge 52 to a front edge 54. A hinge 56 connecting rear edge 52 to frame 14, wall 24 and/or platform 28 enables a deck actuator (e.g., a hydraulic cylinder, a linear motor, a pneumatic cylinder, a bellows, a spring, a linkage, and/or various combinations thereof, etc.) to pivot deck 16 about rear edge 52 to adjustably raise and lower front edge 54. This allows the deck's front edge 54 to be generally aligned to a rear edge 58 of a truck or trailer bed of vehicle 20. To eliminate potentially hazardous pinch points between platform 28 and the deck's lateral edges 60 when deck 16 is raised above platform 28, deck 16 of the illustrated example includes toe guards 62 having metal plates that are fixed to, extending downward from, and flanking deck plate 50. Toe guards 62 slide alongside wall 24 as deck 16 moves to various positions.

The various positions of deck 16 include a raised position (FIG. 4), a lowered position (FIGS. 5 and 6) and a cross-traffic position (FIGS. 1-3). In the raised position, the front edge 54 of the deck 16 is at a predetermined or specified raised elevation (e.g., a maximum or fully raised position). In the lowered position, the front edge 54 is at a predetermined or specified lowered elevation (e.g., a minimum or fully lowered position). In the cross-traffic position, the front edge 54 of the deck 16 is at a predetermined or specified intermediate elevation between the raised and lowered positions or elevations. In some examples, deck plate 50 is substantially flush with platform 28 when deck 16 is in the cross-traffic position.

Still referring to FIGS. 1-6, lip structure 18 includes a plurality of joists 64, a header plate 66 at the front end of joists 64, a lip plate 68 overlying joists 64, at least one deck-supporting foot 70 extending downward from joists 64, and a plurality of gussets 72 attached to the front of header plate 66 and to the underside of lip plate 68. A lip actuator (e.g., a hydraulic cylinder, a linear motor, a pneumatic cylinder, a bellows, a spring, a linkage, and/or various combinations thereof, etc.) moves lip structure 18 between a retracted position (FIG. 1) and various extended positions (FIGS. 2 and 4-6). In the illustrated example, lip structure 18 moves between the retracted and extended positions by translating relative to deck 16. In some examples lip joists 64 slide along deck joists 48. Some example lip structures pivot between retracted and extended positions.

To support deck 16, frame 14 includes various structural members such as, for example, a beam 74 and a front beam 76. To solidly support deck 16 at the cross-traffic position without having to rely on the deck actuator to hold it there, deck-supporting foot 70 of the illustrated example engages and rests upon a landing pad or deck-supporting surface 78 of front beam 76. FIGS. 1 and 3 show deck-supporting foot 70 engaging deck-supporting surface 78 to support deck 16 in the cross-traffic position. In some examples, deck-supporting foot 70 is vertically elongate to allow deck 16 to move between the cross-traffic position (e.g., of FIG. 1) and the lowered position (e.g., of FIG. 6).

In the illustrated examples, at least portions of frame 14 are elevated above ground surface 26 to create an open space 80 for accommodating a protuberance 82 (e.g., a liftgate) that might extend from some examples of vehicle 20. In some examples, as indicated by phantom line 24' of FIG. 3, the width of open space 80 is greater or wider than other the width of other areas of pit 22. To help shield the underside of deck 16 from outdoor air that enters open space 80, some examples of dock leveler 12 include a bottom panel 84 under deck 16 adjacent frame 14. In some examples, bottom panel 84 is thermally insulated. Some examples of bottom panel 84 are attached to frame 14. Some examples of bottom panel 84 are attached to wall 24. In some examples, a front edge 86 of bottom panel 84 is adjacent to front beam 76. In some examples, front edge 86 is adjacent to dock face 34 (see FIG. 7). In some examples, front edge 86 is positioned at an intermediate location between front beam 76 and dock face 34.

FIGS. 7-9 show an example dock leveler 12a that includes an example weather shield 88. FIGS. 7, 8 and 9 correspond to FIGS. 1, 4 and 6, respectively. For example, FIG. 7 shows deck 16 at a cross-traffic position and lip structure 18 at a retracted position. FIG. 8 shows deck 16 at a raised position and lip structure 18 at an extended position (e.g., a fully extended position). FIG. 9 shows deck 16 at a lowered position and lip structure 18 at another extended position (e.g., a not fully extended position).

In this example, weather shield 88 includes a flexible sheet of material having an upper end 90 attached to header plate 66, a lower end 92 attached to front beam 76, and an intermediate section 94 that tends to droop or sag when dock leveler 12a is positioned as shown in FIGS. 7 and 9. The drooping section of weather shield 88 allows deck-supporting foot 70 to descend below deck-supporting surface 78 as shown, for example, in FIG. 9. In some examples, lower end 92 is positioned, located and/or attached to the lower end of front beam 76 adjacent to bottom panel 84'. In some examples, lower end 92 is positioned, located and/or attached to the upper end of front beam 76 near deck-supporting surface 78. Weather shield 88 of the illustrated example has a lateral width extending across substantially a full width 96 (e.g., the width shown in FIG. 3) of pit 22 to create or provide a sliding seal against wall 24 and/or against toe guard 62. The term, "full width" refers to the width of pit 22 in the area above the bottom panel (e.g., bottom panels 84, 84' and 84"). As lip structure 18 extends from the retracted position (FIG. 7) to an extended position (FIGS. 8 and 9), lip structure 18 carries or causes an upper end 90 of the weather shield 88 to move while deck-supporting foot 70 moves between a position behind or rearward of the lower end 92 of the weather shield 88 and a position forward or in front of lower end 92 of the weather shield 88. In this example, front edge 86 of bottom panel 84' is proximate dock face 34 to prevent the intermediate section 94 of weather shield 88 from drooping into open area 80. In other words, as shown in FIGS. 7 and 9, at least a portion of the intermediate section 94 of the example weather shield 88 may rest on the bottom panel 84'. Not only can such drooping interfere with the liftgate 82 of vehicle 20, but if the open space 80 is extra wide and extends to phantom line 24' of FIG. 3, some shields might not be wide enough to seal against the side walls of the pit 22 in the area below the bottom panel (e.g., below bottom panel 84, 84' or 84").

Example materials and construction of weather shield 88 include, but are not limited to, vinyl coated fabric, non-insulated sheet, insulated sheet, single layer sheet, multiple layer sheet, polyester fabric, nylon, canvas, HYPALON (registered trademark of Dupont in Wilmington Del.), canvas duck, rubber impregnated fabric, articulated assembly of a plurality of panels, etc. In some examples, weather shield 88 includes a pliable sheet of material. A pliable sheet or panel means that the sheet or panel can be folded over onto itself and subsequently unfolded without significant permanent deformation to the sheet or panel. The term "panel" refers to a member that has a relatively thin or small dimensional thickness compared to a dimensional width and dimensional length of the panel. For example, a panel is a member having a width and a length that are each at least five times greater than the dimensional thickness of the panel. A panel can be an assembly or a unitary piece or structure. A panel can be insulated, relatively stiff, resiliently flexible and/or a pliable sheet of material.

FIGS. 10-12 show another example dock leveler 12b constructed in accordance with the teachings disclosed herein. The example dock leveler 12b of the illustrated example includes an example weather shield 98. FIGS. 10, 11 and 12 correspond to FIGS. 1, 4 and 6, respectively. For example, FIG. 10 shows deck 16 at a cross-traffic position and lip structure 18 at a retracted position. FIG. 11 shows deck 16 at a raised position and lip structure 18 at an extended position (e.g., a fully extended position). FIG. 12 shows deck 16 at a lowered position and lip structure 18 at another extended position (e.g., a partially extended position).

In this example, weather shield 98 includes a flexible sheet of material having an upper end 100 attached to header plate 66, a lower end 102 attached to bottom panel 84', and an intermediate section 104 between ends 100 and 102. Example materials and construction of weather shield 98 are similar to that of weather shield 88 shown in FIGS. 7-9. Weather shield 98 has a lateral width extending across substantially a full width 96 (FIG. 3) of pit 22 to create a sliding seal against wall 24 and/or against toe guard 62. As lip structure 18 extends from the retracted position (FIG. 10) to an extended position (FIGS. 11 and 12), lip structure 18 carries or moves an upper end 100 of the weather shield 98 while deck-supporting foot 70 moves from a position rearward or behind the lower end 102 of the weather shield 98 to a position forward or in front of the lower end 102. In this example, front edge 86 of bottom panel 84' is proximate dock face 34 to prevent an intermediate section 104 of the weather shield 98 from drooping or sagging into open area 80.

Figure 13:
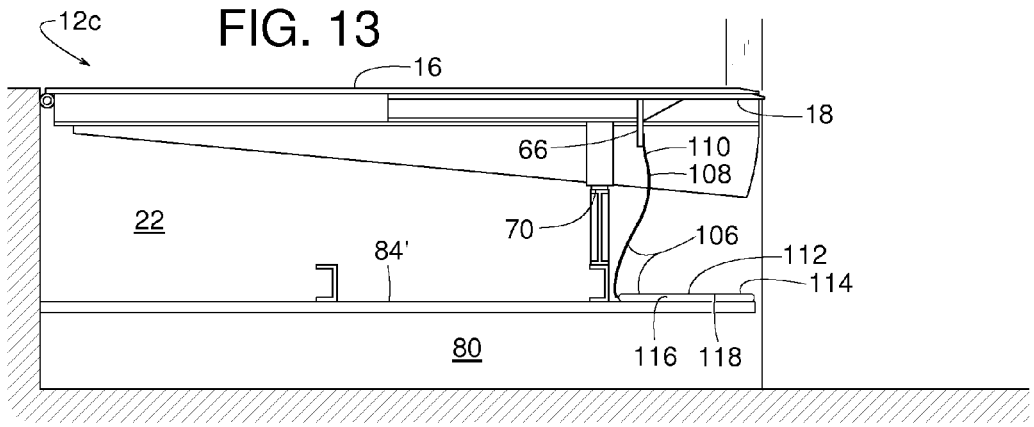
FIG. 13 is a side cross-sectional view similar to FIG. 1 but showing another example dock leveler constructed in accordance with the teachings disclosed herein, wherein the deck is shown in the cross-traffic position and the lip is in the retracted position.
Figure 14:
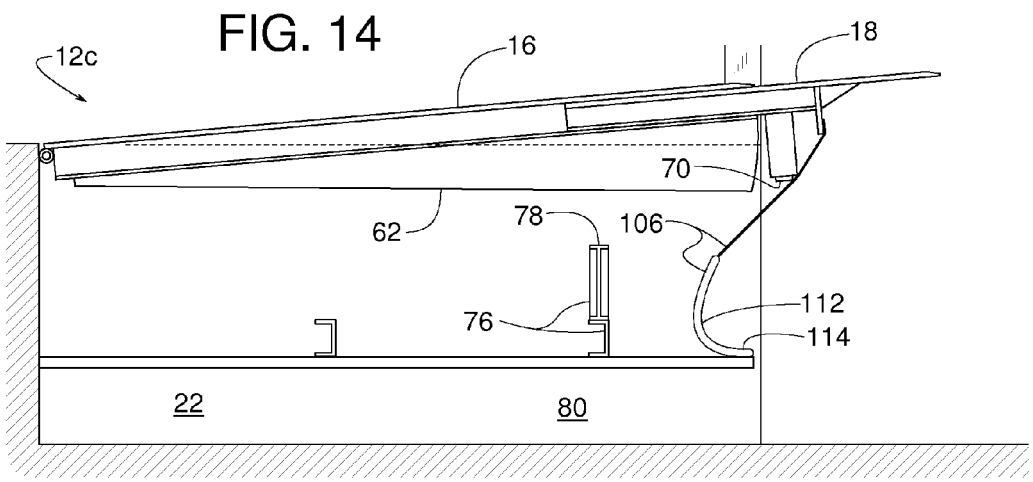
FIG. 14 is a side cross-sectional view similar to FIG. 13 but showing the example deck in a raised position and the example lip in an extended position.
Figure 15:
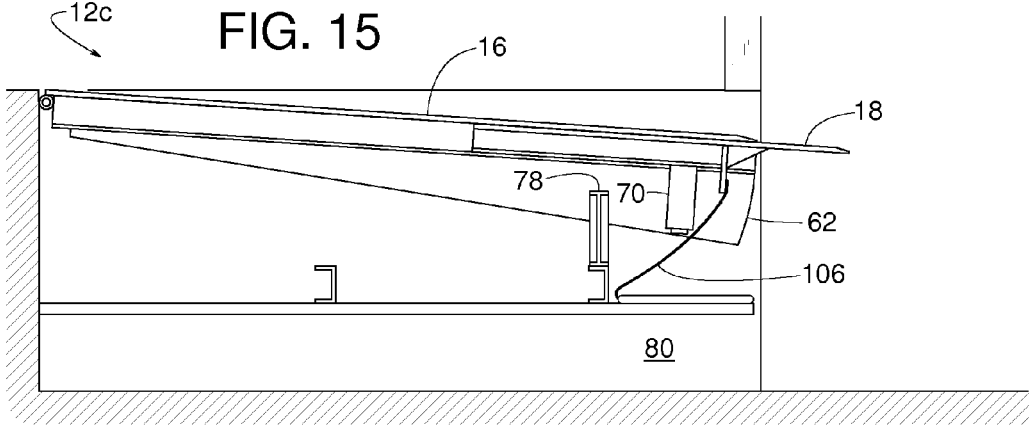
FIG. 15 is a side cross-sectional view similar to FIG. 14 but showing the example deck in a lowered position and the example lip in a partially extended position.

FIGS. 13-15 show an example dock leveler 12c that includes another example weather shield 106 disclosed herein. FIGS. 13, 14 and 15 correspond to FIGS. 1, 4 and 6, respectively. For example, FIG. 13 shows deck 16 at a cross-traffic position with lip structure 18 at a retracted position. FIG. 14 shows deck 16 at a raised position and lip structure 18 at an extended position (e.g., a fully extended position). FIG. 15 shows deck 16 at a lowered position and lip structure 18 at another extended position (e.g., a partially extended position).

In this example, weather shield 106 includes a flexible sheet of material having an upper section 108 with an upper end 110 attached to header plate 66 and a lower section 112 with a lower end 114 attached to bottom panel 84'. Example materials and construction of upper section 108 are similar to that of weather shield 88 shown in FIGS. 7-9. Lower section 112 is resiliently flexible, but stiffer than upper section 108, and is biased downward against bottom panel 84' to reduce or take up slack in the more flexible upper section 108. In some examples, lower section 112 is an insulated panel having a resiliently flexible foam core 116 (layer of thermal insulation) encased within a pliable cover 118, where cover 118 is thinner and more thermally conductive than core 116. In some examples, lower section 112 is a flexible sheet of material similar to weather shield 88 of FIGS. 7-9, but stiffened with one or more elongate stays such as, for example, fiberglass rods or strips of UHMW (ultra-high-molecular-weight polyethylene). In some examples, lower section 112 includes a resiliently flexible sheet of material that is neither pliable nor stiffened by stays, but instead achieves a non-pliable flexible resilience by virtue of its inherent material properties. Specifically, in some examples, lower section 112 comprises a sheet of UHMW.

Weather shield 106, in some examples, has a lateral width extending across substantially a full width 96 (FIG. 3) of pit 22 to create or provide a sliding seal against wall 24 and/or against toe guard 62. As lip structure 18 extends from the retracted position (FIG. 13) to the extended position (FIGS. 14), lip structure 18 carries or moves the upper end 110 of weather shield 106 while deck-supporting foot 70 moves from a position rearward or behind the lower end 112 to a position forward or in front of lower end 112.

Figure 16:
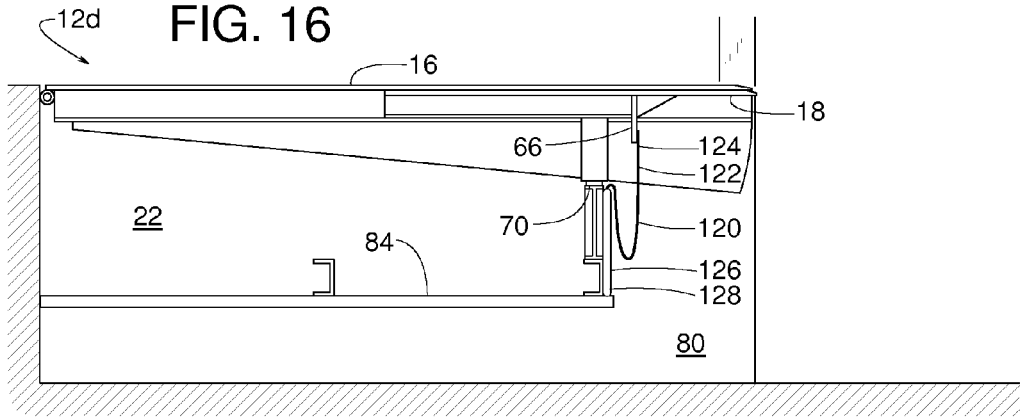
FIG. 16 is a side cross-sectional view similar to FIG. 1 but showing another example dock leveler constructed in accordance with the teachings disclosed herein, wherein the deck is shown in the cross-traffic position and the lip is in the retracted position.
Figure 17:
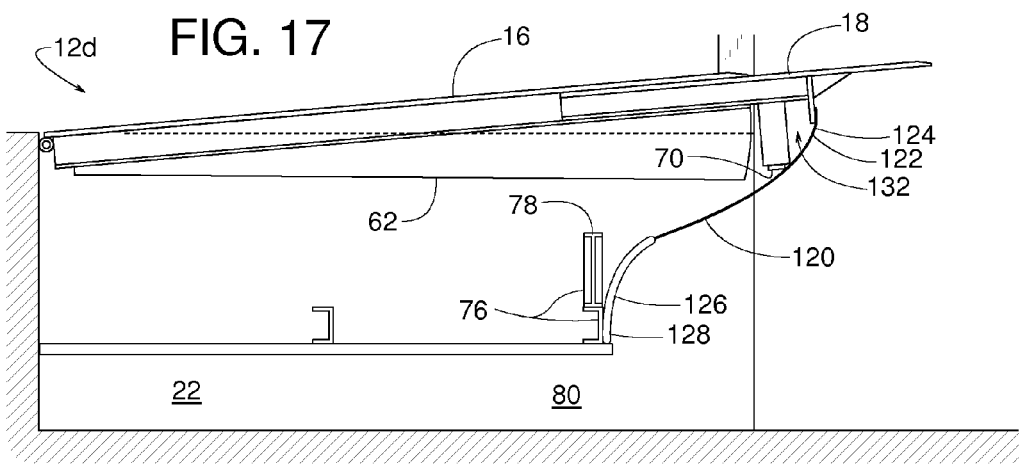
FIG. 17 is a side cross-sectional view similar to FIG. 16 but showing the example deck in a raised position and the example lip in an extended position.
Figure 18:
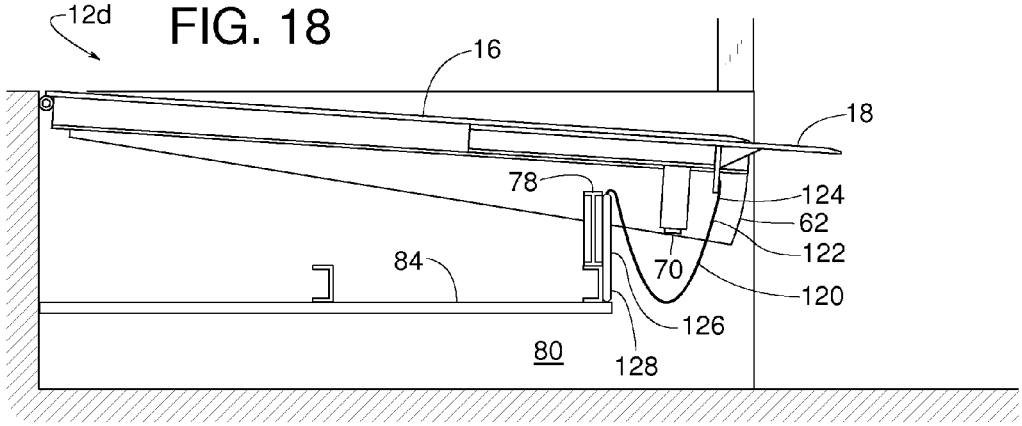
FIG. 18 is a side cross-sectional view similar to FIG. 17 but showing the example deck in a lowered position and the example lip in a partially extended position.

FIGS. 16-18 show another example dock leveler 12d disclosed herein that includes an example weather shield 120. FIGS. 16, 17 and 18 correspond to FIGS. 1, 4 and 6, respectively. For example, FIG. 16 shows deck 16 at a cross-traffic position and lip structure 18 at a retracted position. FIG. 17 shows deck 16 at a raised position with lip structure 18 at an extended position (e.g., a fully extended position). FIG. 18 shows deck 16 at a lowered position and lip structure 18 at another extended position (e.g., a partially extended position).

In this example, weather shield 120 includes a flexible sheet of material having a front section 122 with an upper end 124 attached to header plate 66 and a rear section 126 with a lower end 128 attached to bottom panel 84 and/or to front beam 76. Example materials and construction of front section 122 are similar to that of weather shield 88 shown in FIGS. 7-9. Rear section 126 is resiliently flexible but stiffer than front section 122 and is biased back toward front beam 76 to take up slack in the more flexible front section 122. In some examples, rear section 126 is similar in material and construction to that of lower section 112 of FIGS. 13-15.

Weather shield 120, in some examples, has a lateral width extending across substantially a full width 96 (FIG. 3) of pit 22 to create or provide a sliding seal against wall 24 and/or against toe guard 62. As lip structure 18 extends from the retracted position (FIG. 16) to an extended position (FIGS. 17 and 18), the lip structure 18 carries or moves the weather shield's upper end 124 while deck-supporting foot 70 moves from being behind the shield's lower end 128 to being forward or in front of lower end 128.

FIGS. 19-21 show another example dock leveler 12e constructed in accordance with the teachings disclosed herein. The example dock leveler 12d is similar to dock leveler 12d of FIGS. 16-18. However, weather shield 120 of dock leveler 12e is flanked by two side sealing members 130 In the illustrated example, the side sealing members 130 include a right side sealing member 130a and a left side sealing member 130b. Side sealing members 130 close or significantly reduce lateral air gaps 132 (FIG. 17) that may exist when lip structure 18 is fully extended. In some examples, each of the side sealing members 130 is generally planar and lies substantially perpendicular to horizontal lateral direction 44. In some examples, each of the side sealing members 130 is in sliding contact with wall 24 and/or with toe guard 62 as dock leveler 12e moves.

In some examples, side sealing members 130 are attached to and suspended from lip structure 18. In some examples, side sealing members 130 are in sliding sealing contact with the lateral edges of weather shield 120. In some examples, side sealing members 130 are attached to the lateral edges of weather shield 120. In some examples, the installation of side sealing members 130 is such that the side sealing members 130 extend to a position forward or in front of the deck's front edge 54 when lip structure 18 is in the extended position, as shown in FIG. 20, and the deck's front edge 54 is forward of the side sealing members 130 when lip structure 18 is in the retracted position, as shown in FIG. 19. Each deck-supporting foot 70, in some examples, is interposed laterally between the two side sealing members 130a and 130b.

In some examples, each of the side sealing members 130 is a relatively thin sheet of material. In some examples, each of the side sealing members 130 has a thickness extending the full lateral distance between deck-supporting foot 70 and wall 24 and/or between deck-supporting foot 70 and toe guard 62. In some examples, side sealing members 130 are made of a material similar to the material of weather shield 88 (FIGS. 7-9). In some examples, side sealing members 130 are composed of a material and construction similar to that of lower section 112 of weather shield 106 (FIGS. 13-15). In some examples, each of the side sealing members 130 is an insulated panel including a resiliently compressible foam core encased within a pliable cover. Although side sealing members 130 are shown with the example dock leveler 12e, sealing members 130 can be provided or added to any other ones of the example dock levelers (e.g., dock levers 12a-12d) disclosed herein.

FIGS. 22-24 show another example dock leveler 12f constructed in accordance with the teachings disclosed herein. The example dock leveler 12f is similar to dock leveler 12d of FIGS. 16-18. However, dock leveler 12f has a block style side sealing member 132 that includes a central side sealing member 132c extending between right and left side sealing members 132a and 132b. A weather shield 134 is provided that is similar to weather shield 120 of FIGS. 16-21. However, weather shield 134 has an upper end 136 attached to the bottom of side sealing member 132. In some examples, side sealing member 132 includes a pliable cover 138 encasing a resiliently compressible foam core 140, where foam core 140 fills central side sealing member 132c and both the right and left side sealing members 132a and 132b.

FIGS. 25-27 show another example dock leveler 12g disclosed herein that includes an example weather shield 142. FIGS. 25, 26 and 27 correspond to FIGS. 1, 4 and 6, respectively. FIG. 25 shows deck 16 at a cross-traffic position and lip structure 18 at a retracted position. FIG. 26 shows deck 16 at a raised position and lip structure 18 at an extended position (e.g., a fully extended position). FIG. 27 shows deck 16 at a lowered position and lip structure 18 at another extended position (e.g., a partially extended position).

In this example, weather shield 142 includes a flexible sheet of material having a front section 144 with an upper end 146 attached to header plate 66, a rear section 148 with a lower end 150 attached bottom panel 84 and/or to front beam 76, and an intermediate section 152 between sections 144 and 148. Example materials and construction of front section 144 are similar to that of weather shield 88 shown in FIGS. 7-9. Rear section 148 is resiliently flexible but stiffer than front section 144 and is biased toward front beam 76 to take up slack in the weather shield 142. In some examples, rear section 148 is similar in material and construction to that of lower section 112 of FIGS. 13-15.

Intermediate section 152, in some examples, is stiffer than front section 144 to reduce the extent to which weather shield 142 droops or sags when lip structure 18 is retracted (FIG. 25) or partially extended (FIG. 27). In some examples, instead of drooping excessively when deck 16 is in the lowered position and/or when lip structure 18 is partially extended, intermediate section 152 extends generally flat or substantially horizontal underneath deck-supporting foot 70 as shown, for example, in FIG. 27. In some examples, intermediate section 152 is similar in material and construction to that of lower section 112 of FIGS. 13-15. In some examples, intermediate section 152 is generally rigid and stiffer than rear section 148.

Weather shield 142, in some examples, has a lateral width extending across substantially the full width 44 (FIG. 3) of pit 22 to create a sliding seal against wall 24 and/or against toe guard 62. As lip structure 18 extends from the retracted position (FIG. 25) to an extended position (FIGS. 26 and 27), lip structure 18 carries the upper end 146 of the weather shield 142 while deck-supporting foot 70 moves between a position rearward or behind the lower end 150 and a position forward or in front of lower end 150.

FIGS. 28-30 show an example dock leveler 12h that includes another example weather shield 154 disclosed herein. FIGS. 28, 29 and 30 correspond to FIGS. 1, 4 and 6, respectively. FIG. 28 shows deck 16 at a cross-traffic position and lip structure 18 at a retracted position. FIG. 29 shows deck 16 at a raised position and lip structure 18 at an extended position (e.g., a fully extended position). FIG. 30 shows deck 16 at a lowered position and lip structure 18 at another extended position (e.g., a partially extended position).

In this example, the weather shield 154 includes a flexible sheet of material having a front panel 156 with an upper end 158 attached to header plate 66, a rear panel 160 with a lower end 162 attached to bottom panel 84 and/or to front beam 76, a first intermediate panel 164 connected to rear panel 160, and a second intermediate panel 166 between panels 156 and 164. In this example, the plurality of panels 156, 160, 164 and 166 are interconnected by a plurality of joints 168 that are more flexible than panels 156, 160, 164 and 166. Example materials of joints 168 are similar to that of weather shield 88 shown in FIGS. 7-9. Example materials and construction of panels 156, 160, 164 and 166 are similar in material and construction to that of lower section 112 of FIGS. 13-15.

In some examples, panels 156, 164 and 166 are relatively stiff and more rigid than rear panel 160. Intermediate panels 164 and 166 are relatively stiff to reduce the extent to which weather shield 154 droops or sags when lip structure 18 is retracted (FIG. 28) or partially extended (FIG. 30). In some examples, instead of drooping excessively when deck 16 is in the lowered position and/or when lip structure 18 is partially extended, intermediate panel 166 extends generally flat or substantially horizontal underneath deck-supporting foot 70 as shown, for example, in FIG. 30.

Weather shield 154, in some examples, has a lateral width extending across substantially the full width 96 (FIG. 3) of pit 22 to create or provide a sliding seal against wall 24 and/or against toe guard 62. As lip structure 18 extends from the retracted position (FIG. 28) to an extended position (FIGS. 29 and 30), the lip structure 18 carries or moves the upper end 158 of the weather shield 154 while deck-supporting foot 70 moves between a position rearward or behind the lower end 162 and a position forward or in front of lower end 162.

Figure 31:
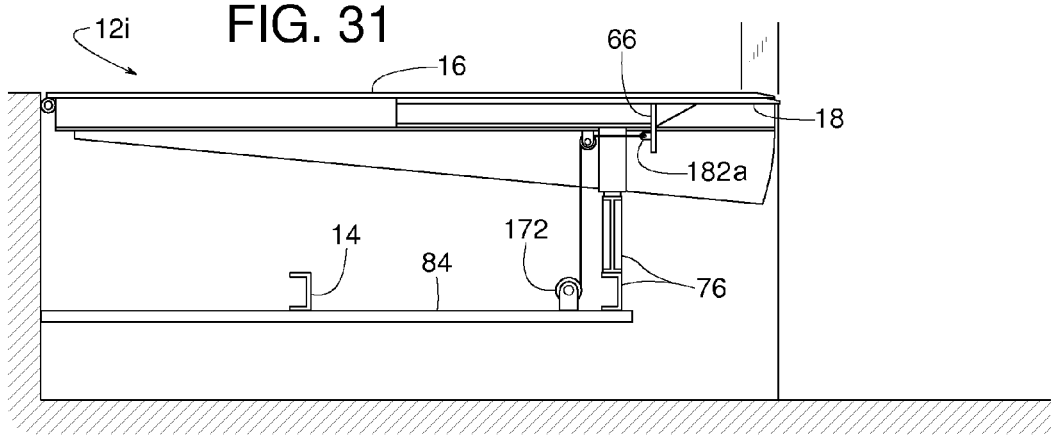
FIG. 31 is a side cross-sectional view similar to FIG. 1 but showing another example dock leveler constructed in accordance with the teachings disclosed herein, wherein the deck is shown in the cross-traffic position and the lip is in the retracted position.
Figure 32:
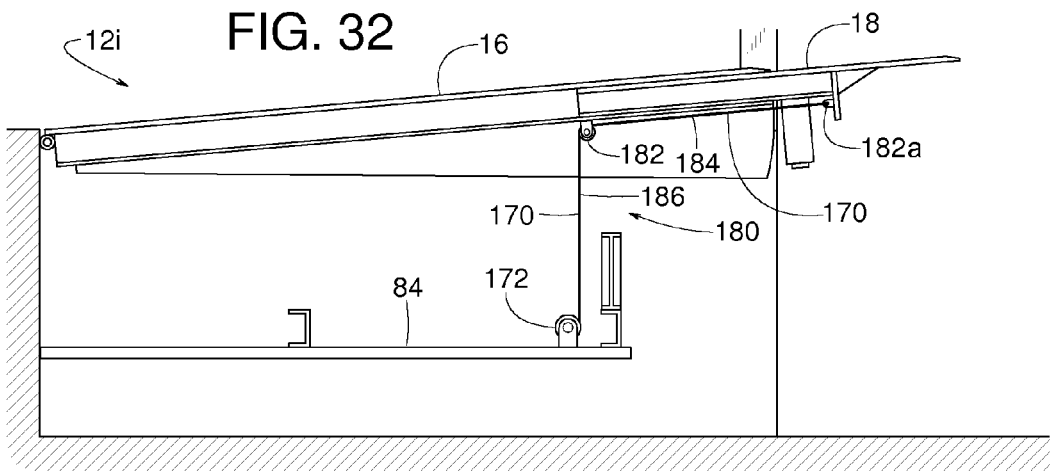
FIG. 32 is a side cross-sectional view similar to FIG. 31 but showing the example deck in a raised position and the example lip in an extended position.
Figure 33:
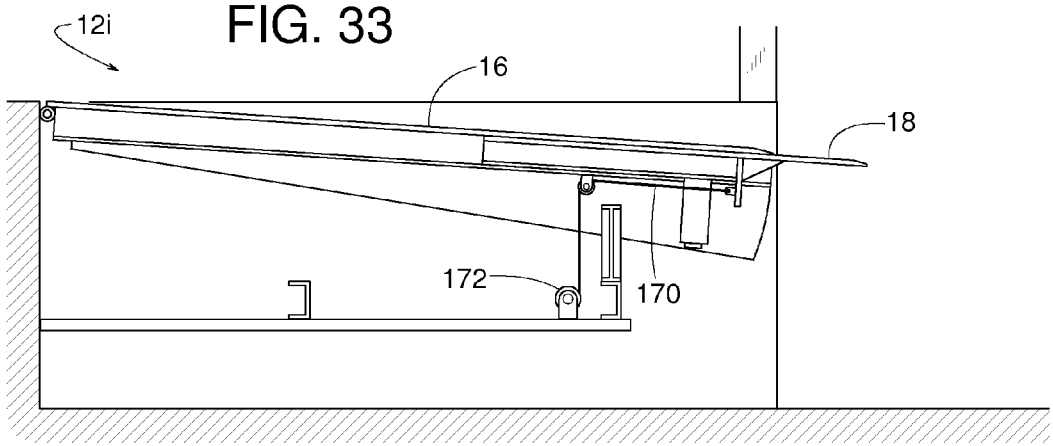
FIG. 33 is a side cross-sectional view similar to FIG. 32 but showing the example deck in a lowered position and the example lip in a partially extended position.

FIGS. 31-33 show another example dock leveler 12i constructed in accordance with the teachings disclosed herein. The example dock leveler 12i includes an example weather shield 170 that extends over a variable length. FIGS. 31, 32 and 33 correspond to FIGS. 1, 4 and 6, respectively. FIG. 31 shows deck 16 at a cross-traffic position and lip structure 18 at a retracted position. FIG. 32 shows deck 16 at a raised position and lip structure 18 at an extended position (e.g., a fully extended position). FIG. 33 shows deck 16 at a lowered position and lip structure 18 at another extended position (e.g., a partially extended position).

In this example, weather shield 170 includes a flexible sheet of material that extends or adjusts along a variable distance from a shield take-up system 172. In some examples, the flexible sheet of material is similar to some examples of weather shield 88, shown in FIGS. 7-9. A shield take-up system is any device for selectively releasing and retracting a flexible sheet of material. In the example shown in FIGS. 31-33, the shield take-up system 172 is a spring loaded roller. In the example shown in FIGS. 34-36, an example dock leveler 12j disclosed herein includes a shield take-up system 174 in the form of an elastic elongate member 176 attached to a flexible sheet 178. Examples of elastic elongate member 176 include, but are not limited to, a helical spring, a pneumatic spring, an elastic cord, an elastic strap, etc.

Returning to the example shown in FIGS. 31-33, weather shield 170 covers a gap 180 between deck 16 and bottom panel 84 by spanning the distance between the point of attachment 182a of the weather shield 170 on lip structure 18 and shield take-up system 172 on frame 14, front beam 76 and/or bottom panel 84. In some examples, the locations of point 182a and shield take-up system 172 are reversed, where shield take-up system 172 is attached to lip structure 18, and the point of attachment 182a of the weather shield 170 is on frame 14, front beam 76 and/or on bottom panel 84. In either example, as the distance between shield take-up system 172 and attachment point 182a changes (e.g., increases or decreases), shield take-up system 172 retracts or pays out weather shield 170 accordingly.

In the illustrated example, a shield guide member 182 is attached to deck 16 and situated between an upper section 184 of weather shield 170 and a lower section 186 of weather shield 170. The shield guide member 182 of the illustrated example enables weather shield 170 to change travel direction upon passing across shield guide member 182. In some examples, shield guide member 182 is a bar or rod across which weather shield 170 slides. In some examples, shield guide member 182 is a roller across which weather shield 170 travels.

Figure 34:
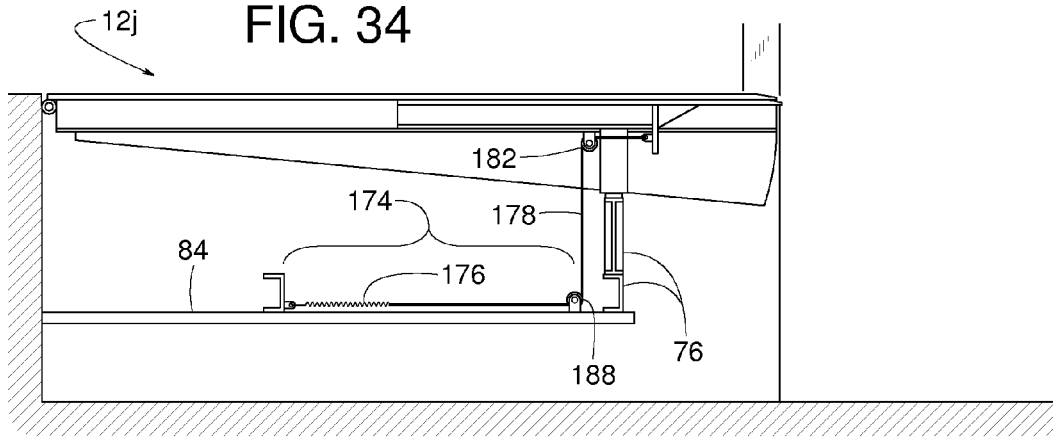
FIG. 34 is a side cross-sectional view similar to FIG. 1 but showing another example dock leveler constructed in accordance with the teachings disclosed herein, wherein the deck is shown in the cross-traffic position and the lip is in the retracted position.
Figure 35:
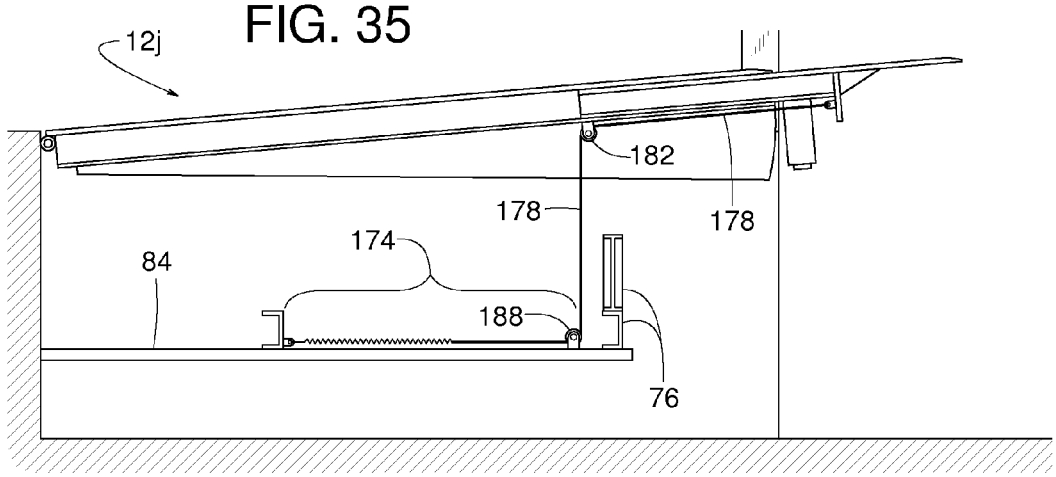
FIG. 35 is a side cross-sectional view similar to FIG. 34 but showing the example deck in a raised position and the example lip in an extended position.
Figure 36:
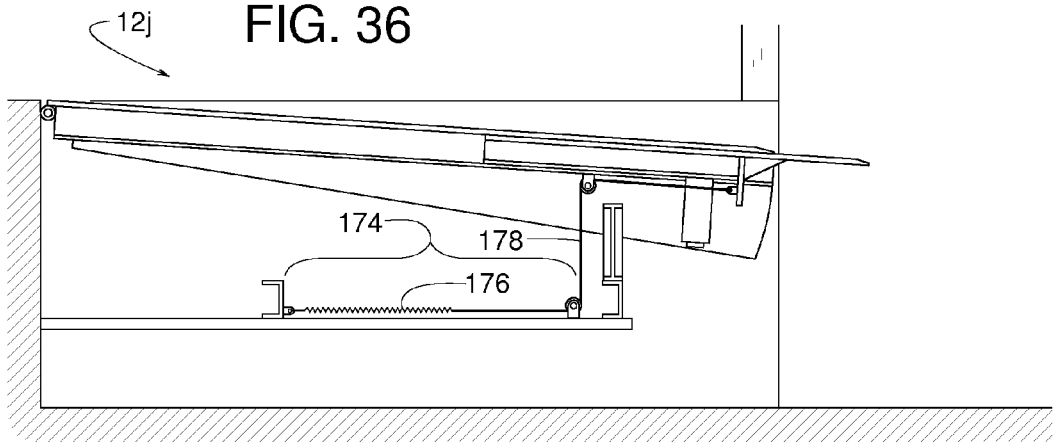
FIG. 36 is a side cross-sectional view similar to FIG. 35 but showing the example deck in a lowered position with the example lip in a partially extended position.
Figure 37:
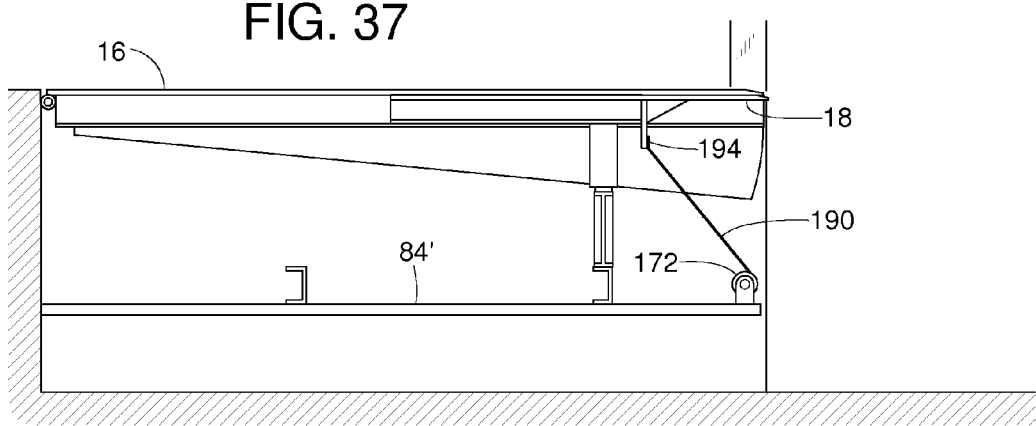
FIG. 37 is a side cross-sectional view similar to FIG. 1 but showing another example dock leveler constructed in accordance with the teachings disclosed herein, wherein the deck is shown in the cross-traffic position and the lip is in the retracted position.

Referring to the example shown in FIGS. 34 and 36, dock leveler 12j includes an additional shield guide member 188. Shield guide member 188 redirects sheet 178 from traveling generally parallel relative to bottom panel 84 to traveling vertically behind front beam 76.

Figure 38:
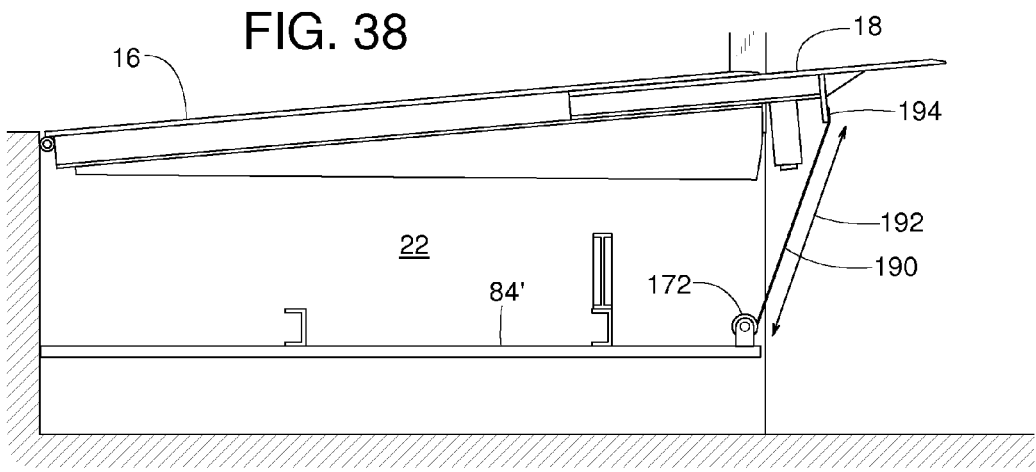
FIG. 38 is a side cross-sectional view similar to FIG. 37 but showing the example deck in a raised position and the example lip in an extended position.
Figure 39:
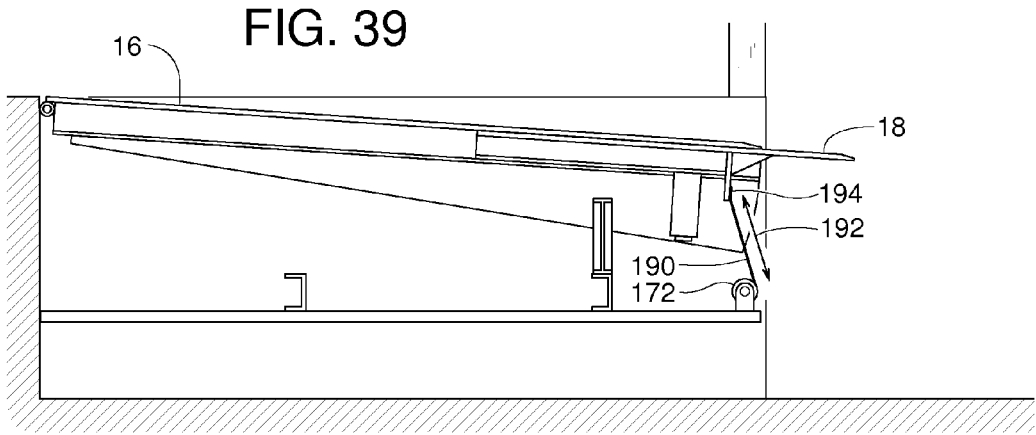
FIG. 39 is a side cross-sectional view similar to FIG. 38 but showing the example deck in a lowered position and the example lip in a partially extended position.

FIGS. 37-39 illustrate another example weather shield 190 disclosed herein. In the example shown in FIGS. 37-39, the example weather shield 190, in the form of a flexible sheet, extends a variable distance 192 between an upper point of attachment 194 on lip structure 18 and shield take-up member 172 attached to bottom panel 84'. In this example and in the examples shown in FIGS. 31-36, weather shields 170, 178 and 190 have a lateral width extending across substantially the full width 96 (FIG. 3) of pit 22 to create or provide a sliding seal against wall 24 and/or against toe guard 62.

To produce weather shields that fit dock pits of various widths, some example weather shields, such as those disclosed herein, can be made to different widths by assembling select shield segments from a weather shield collection of parts 196, as shown in FIG. 40. In the illustrated example, the weather shield collection of parts 196 includes a main shield segment 198, a first seal segment 200, a second seal segment 202 and a sealing strip 204. The weather shield collection of parts 196 can have any number of seal segments and/or other parts. In some examples, a fastener 206 provides means for interconnecting the weather shield collection of parts in various combinations. Examples of interconnecting means that may implement fastener 206 include, but are not limited to, a touch-and-hold fastener, a zipper, a series of snaps, adhesive, etc. Although some adhesives might not provide a disconnectable or detachable seam, many other example chemical fastener(s) provide a detachable seam. Some examples of a touch-and-hold faster include, but are not limited to, a hook-and-loop fastener, VELCRO, etc., where VELCRO is a registered trademark of Velcro Industries in Amsterdam, the Netherlands.

FIG. 40 shows the weather shield collection of parts 196 being assembled in various ways to create selectively a narrower weather shield 208, a wider weather shield 210, and an even wider weather shield 212. Arrow 214 represents joining and arrow 216 represents separating main shield segment 198 and the first shield segment 200, thereby creating selectively a wider weather shield 210 or a narrower weather shield 208. In the illustrated example, the wider weather shield 210 includes the main shield segment 198 and the first shield segment 200, and the narrower weather shield 208 includes the main shield segment 198 with neither the first shield segment 200 nor the second shield segment 202. For sake of example, arrow 218 represents installing one of the assembled weather shields (e.g., a wider weather shield 210 underneath deck 16).

In some examples, fastener 206 selectively attaches sealing strip 204 or shield segment 200 or 202. When sealing strip 204 is attached, sealing strip 204 is positioned in sliding seal contact with part (e.g., a toe guard) of an example dock leveler 12k and/or in sliding seal contact with wall 24 as shown, for example, in the lower right corner of FIG. 40. In some examples, one sealing strip 204' is permanently attached to one lateral edge of main shield segment 198 while fastener 206 attaches the other sealing strip 204 to the other lateral edge of main shield segment 198 or to a shield segment 200 or 202. In some example weather shields have two sealing strips 204, while neither sealing strip 204 is permanently attached. Instead, fastener 206, in some examples, is used to attach both sealing strips 204.

FIG. 40 shows shield segments 200 and 202 being added or removed from only the right lateral edge of main shield segment 198. However, in some examples, shield segments 200 and 202 are also added or removed from the left lateral edge of main shield segment 198 as well, thereby providing the assembled weather shield with a more balanced or symmetrical appearance.

Any suitable means can be used for attaching the example weather shields disclosed herein. Example means for attaching a weather shield to a dock leveler lip structure, frame, and/or bottom panel include, but are not limited to, screws, rivets, snaps, magnets, touch-and-hold fasteners, spring loaded clips, clamps, adhesives, and/or various combinations thereof.

FIGS. 41-43 show another example dock leveler 12m constructed in accordance with the teachings disclosed herein. The example dock leveler 12m includes an example weather shield 220. FIGS. 41, 42 and 43 correspond to FIGS. 1, 4 and 6, respectively. FIG. 41 shows deck 16 at a cross-traffic position and lip structure 18 at a retracted position. FIG. 42 shows deck 16 at a raised position and lip structure 18 at an extended position (e.g., a fully extended position). FIG. 43 shows deck 16 at a lowered position and lip structure 18 at another extended position (e.g., a partially extended).

In this example, weather shield 220 includes a flexible sheet of material having a front section 222 with an upper end 224 attached to header plate 66 and a rear section 226 with a lower end 228 attached to bottom panel 84 and/or to front beam 76. To reduce (e.g., minimize) drooping or sagging of weather shield 220, rear section 226 is an accordion-like structure having a plurality of resilient shield panels 230 interconnected along their upper and lower edges such that each shield panel 230 is biased back toward front beam 76. Any suitable means can be used for interconnecting or coupling panels 230. Some example means include, but are not limited to, threads (sewn seam), screws, rivets, snaps, touch-and-hold fasteners, clamps, adhesives, ultrasonic welding, RF welding, hot plate welding, and/or various combinations thereof. In some examples, rear section 226 is a tightly folded unitary piece, where panels 230 are integrally joined along their upper and lower edges.

In some examples, each panel 230 includes a resiliently compressible foam core (layer of thermal insulation) encased within a pliable cover. In some examples, each panel 230 is a flexible sheet of material similar to weather shield 88 of FIGS. 7-9, but stiffened with one or more elongate stays, such as fiberglass rods or strips of UHMW (ultra-high-molecular-weight polyethylene). In some examples, each panel 230 includes a resilient sheet of material that is neither pliable nor stiffened by stays, but instead achieves a non-pliable flexible resilience by virtue of its inherent material properties. Specifically, in some examples, each panel 230 is a sheet of UHMW.

In some examples, front section 222 of weather shield 220 is of a similar construction to that of rear section 226, where front section 222 is an accordion-like extension of rear section 226. Some example materials and construction of front section 222 are similar to that of weather shield 88, shown in FIGS. 7-9.

Weather shield 220, in some examples, has a lateral width extending across substantially a full width 96 (FIG. 3) of pit 22 to create or provide a sliding seal against wall 24 and/or against toe guard 62. As lip structure 18 extends from the retracted position (FIG. 41) to an extended position (FIGS. 42 and 43), the lip structure 18 carries or moves the upper end 224 of the weather shield 226 while deck-supporting foot 70 moves between a position rearward or behind the lower end 228 of the weather shield 226 to a position forward or in front of lower end 228.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A dock leveler for use with a vehicle parked at a loading dock, the loading dock having a pit defined by a wall extending between a ground surface of the loading dock and a platform of the loading dock, the dock leveler comprising:
   a deck extending in a forward direction from a rear edge of the deck to a front edge of the deck, the forward direction being perpendicular to a horizontal lateral direction, the deck extending over the pit and being movable between a raised position, a lowered position and a cross-traffic position, the front edge of the deck being at an elevation higher than the platform when the deck is in the raised position, the front edge being at an elevation lower than the platform when the deck is in the lowered position, and the front edge being at an intermediate elevation between the raised and lowered positions when the deck is in the cross-traffic position;
   a lip structure proximate the front edge of the deck and being translatable relative to the deck between an extended position to reach the vehicle and a retracted position away from the vehicle, the lip structure being more forward in the extended position than in the retracted position;
   a frame disposed within the pit underneath the deck, the frame including a deck-supporting surface;
   a deck-supporting foot extending from the lip structure, the deck-supporting foot to engage the deck-supporting surface when the deck is in the cross-traffic position while the lip structure is in the retracted position, the deck-supporting foot being spaced apart and higher than the deck-supporting surface when the deck is in the raised position, the deck-supporting foot being spaced apart and lower than the deck-supporting surface when the deck is in the lowered position, the deck-supporting foot being spaced apart from the deck-supporting surface when the lip structure is in the extended position; and
   a weather shield having a lower end and an upper end, the lower end of the weather shield to be coupled to at least one of the frame and the wall of the pit, the upper end of the weather shield being carried by the lip structure, the lower end of the weather shield being positioned forward of the deck-supporting foot when the deck is in the cross-traffic position while the lip structure is in the retracted position, the deck-supporting foot being positioned forward of the lower end of the weather shield when the lip structure is in the extended position.

2. The dock leveler of claim 1, wherein the deck supporting foot is vertically elongate and extends downward from the lip structure.

3. The dock leveler of claim 1, wherein the frame includes a front beam that is horizontally elongate and extends substantially parallel to the front edge of the deck, and the lower end of the weather shield is attached to the front beam.

4. The dock leveler of claim 1, wherein the lip structure includes a header plate that is horizontally elongate and extends substantially parallel to the front edge of the deck, and the upper end of the weather shield is attached to the header plate.

5. The dock leveler of claim 1, wherein the weather shield comprises a plurality of panels that are flexible and interconnected, the plurality of panels includes a first panel and a second panel, the first panel being resiliently flexible and stiffer than the second panel.

6. The dock leveler of claim 5, wherein the first panel resiliently bends in reaction to the lip structure moving between the extended position and the retracted position, the first panel has a curvature that is more pronounced when the lip structure is at the extended position while the deck is at the raised position than when the lip structure is at the retracted position while the deck is at the cross-traffic position.

7. The dock leveler of claim 5, wherein the second panel comprises a pliable sheet.

8. The dock leveler of claim 1, wherein the weather shield comprises a plurality of panels that are interconnected, the plurality of panels includes a front panel, a rear panel, and an intermediate panel, the front panel being connected to the lip structure, the rear panel being connected to at least one of the frame, the bottom panel and the wall, and the intermediate panel extending between the front panel and the rear panel.

9. The dock leveler of claim 8, further comprising a plurality of joints connecting the intermediate panel to the front panel and the rear panel, the plurality of joints each being more flexible than at least one of the front panel, the rear panel, or the intermediate panel.

10. The dock leveler of claim 8, further comprising a plurality of joints connecting the intermediate panel to the front panel and the rear panel, the plurality of joints each being more flexible than the front panel, the rear panel, and the intermediate panel.

11. The dock leveler of claim 1, wherein the weather shield includes a front section, a rear section and an intermediate section structured such that:
   a) the front section is positioned forward of the deck-supporting foot,
   b) when the deck is in the lowered position, the rear section is positioned higher than the deck-supporting foot and the deck supporting foot is positioned forward of the rear section, and
   c) the intermediate section is positioned underneath the deck-supporting foot when the deck is in the lowered position.

12. The dock leveler of claim 11, wherein the front section, the rear section and the intermediate section are each positioned forward of the deck-supporting foot when the deck is in the cross-traffic position.

13. The dock leveler of claim 11, wherein the weather shield comprises a plurality of shield panels that are interconnected by a plurality of joints each of which are more flexible than the plurality of shield panels.

14. The dock leveler of claim 11, wherein the bottom panel is lower than the intermediate section of the weather shield when the deck is in the lowered position.

15. The dock leveler of claim 11, wherein the bottom panel is lower than the intermediate section of the weather shield when the deck is in the cross-traffic position.

16. The dock leveler of claim 1, wherein the weather shield includes a layer of thermal insulation.

17. The dock leveler of claim 1, wherein the weather shield comprises a cover overlying a layer of thermal insulation, and the cover has a thickness that is thinner than a thickness of the layer of thermal insulation.

18. The dock leveler of claim 1, wherein the weather shield comprises a cover overlying a layer of thermal insulation, and the cover is more thermally conductive than the layer of thermal insulation.

19. The dock leveler of claim 1, wherein the deck is substantially flush with the platform when the deck is in the cross-traffic position.

20. The dock leveler of claim 1, further comprising a right side sealing member and a left side sealing member each being generally planar and lying substantially perpendicular to the horizontal lateral direction, the right side sealing member and the left side sealing member extending forward of the front edge of the deck when the lip structure is in the extended position, the front edge of the deck being forward of the right side sealing member and the left side sealing member when the lip structure is in the retracted position, the deck-supporting foot being interposed laterally between the right side sealing member and the left side sealing member, and the weather shield to extend laterally between the right side sealing member and the left side sealing member.

21. The dock leveler of claim 20, wherein the weather shield is in sliding sealing contact with the right side sealing member and the left side sealing member.

22. The dock leveler of claim 20, wherein the weather shield is attached to the right side sealing member and the left side sealing member.

23. The dock leveler of claim 20, wherein the right side sealing member comprises resiliently compressible foam.

24. The dock leveler of claim 20, wherein the right side sealing member comprises a pliable sheet.

25. The dock leveler of claim 20, further comprising a toe guard extending downward from the deck, the toe guard being generally planar and being substantially perpendicular relative to the horizontal lateral direction, the toe guard to extend above the platform when the deck is in the raised position, the right side sealing member being in sealing contact with the toe guard.

26. The dock leveler of claim 20, wherein the right side sealing member is in sliding sealing contact with the wall.

27. The dock leveler of claim 1, wherein the weather shield has an adjustable width to fit a pit having an indeterminate width.

28. The dock leveler of claim 27, wherein the weather shield comprises a plurality of shield segments of which at least one shield segment is removable to provide the weather shield with the adjustable width.

29. The dock leveler of claim 28, wherein weather shield includes a detachable seam, and the at least one shield segment is removable by virtue of the detachable seam.

30. The dock leveler of claim 29, wherein the detachable seam comprises a touch-and-hold fastener.

31. The dock leveler of claim 1, wherein the weather shield includes a removable shield segment that upon removal reduces an overall width of the weather shield.

32. The dock leveler of claim 1, further comprising a bottom panel underneath the deck, adjacent the frame, and spaced above the ground surface to define an open space between the bottom panel and the ground surface, wherein the weather shield is attached to at least one of the frame, the bottom panel, or the wall of the pit.

* * * * *